US010286626B2

(12) United States Patent
Parsons et al.

(10) Patent No.: US 10,286,626 B2
(45) Date of Patent: May 14, 2019

(54) PRESSURE DISTRIBUTING ALIGNED ARRAYS OF CUSHIONING VOID CELLS

(71) Applicant: SKYDEX Technologies, Inc, Centennial, CO (US)

(72) Inventors: David Parsons, Swansea, IL (US); Eric William Sugano, Arvada, CO (US)

(73) Assignee: Skydex Technologies, Inc., Centennial, CO (US)

( * ) Notice: Subject to any disclaimer, the term of this patent is extended or adjusted under 35 U.S.C. 154(b) by 138 days.

(21) Appl. No.: 15/206,592

(22) Filed: Jul. 11, 2016

(65) Prior Publication Data
US 2017/0008249 A1   Jan. 12, 2017

Related U.S. Application Data

(60) Provisional application No. 62/190,627, filed on Jul. 9, 2015.

(51) Int. Cl.
*B32B 3/28* (2006.01)
*A47C 27/08* (2006.01)
*B29C 69/00* (2006.01)
*B32B 3/12* (2006.01)
(Continued)

(52) U.S. Cl.
CPC .............. *B32B 3/28* (2013.01); *A47C 27/081* (2013.01); *A47C 27/085* (2013.01);
(Continued)

(58) Field of Classification Search
CPC ..... Y10T 428/24661; Y10T 428/24678; Y10T 428/234; F16F 7/121; F16F 1/376;
(Continued)

(56) References Cited

U.S. PATENT DOCUMENTS 5,030,501 A   7/1991 Colvin et al.
5,572,804 A   11/1996 Skaja et al.
(Continued)

FOREIGN PATENT DOCUMENTS

WO   20160174431 A1   11/2016

OTHER PUBLICATIONS

"International Search Report and Written Opinion Issued in PCT Application No. PCT/US2016/041796", dated Oct. 19, 2016, 11 Pages.
(Continued)

*Primary Examiner* — Catherine A. Simone
(74) *Attorney, Agent, or Firm* — Holzer Patel Drennan

(57) ABSTRACT

Implementations described and claimed herein include a cellular cushioning system comprising a first matrix of void cells, and a second matrix of void cells opposing the first matrix of void cells, wherein one or more peaks of each void cell in the second matrix is attached to one or more peaks of each void cell in the first matrix, and wherein the void cells of the first matrix have a higher cell resolution than the void cells of the second matrix. In another implementation, a method of manufacturing a cushioning system includes molding a first matrix of void cells, molding a second matrix of void cells, the void cells of the first matrix having a higher cell resolution than the void cells in the second matrix, and attaching peak surfaces of the void cells of the first matrix and peak surfaces of the void cells of the second matrix together.

20 Claims, 18 Drawing Sheets

(51) Int. Cl.
*B32B 7/00* (2019.01)
*B32B 7/04* (2019.01)
*B32B 25/00* (2006.01)
*B32B 27/30* (2006.01)
*B32B 27/40* (2006.01)
*B29K 101/12* (2006.01)
*B29K 105/00* (2006.01)
*B29L 22/00* (2006.01)

(52) U.S. Cl.
CPC ............ *A47C 27/088* (2013.01); *B29C 69/00* (2013.01); *B32B 3/12* (2013.01); *B32B 7/005* (2013.01); *B32B 7/045* (2013.01); *B32B 25/00* (2013.01); *B32B 27/302* (2013.01); *B32B 27/40* (2013.01); *B29K 2101/12* (2013.01); *B29K 2105/256* (2013.01); *B29L 2022/007* (2013.01); *B32B 2250/02* (2013.01); *B32B 2274/00* (2013.01); *B32B 2307/412* (2013.01); *B32B 2307/50* (2013.01); *B32B 2307/546* (2013.01); *B32B 2307/56* (2013.01); *B32B 2307/72* (2013.01); *B32B 2307/732* (2013.01)

(58) Field of Classification Search
CPC ........... A42B 3/12; A42B 3/121; A42B 3/125; B32B 3/12; B32B 3/28; F41H 5/023; F41H 5/24; F41H 7/042; A47C 27/085; A47C 27/088; A47C 27/081; A47C 27/15; A47C 27/001; E04F 15/225
USPC ............................ 428/72, 166, 178, 180, 198
See application file for complete search history.

(56) References Cited

U.S. PATENT DOCUMENTS

| | | |
|---|---|---|
| 5,638,565 A | 6/1997 | Pekar |
| 5,851,626 A | 12/1998 | McCorry et al. |
| 5,976,451 A | 11/1999 | Skaja et al. |
| 6,029,962 A | 2/2000 | Shorten et al. |
| 6,098,313 A | 8/2000 | Skaja |
| 6,415,467 B1 | 7/2002 | Bretvin |
| 6,777,062 B2 | 8/2004 | Skaja |
| 7,033,666 B2 | 4/2006 | Skaja |
| 7,574,760 B2 | 8/2009 | Foley et al. |
| 8,196,240 B2 * | 6/2012 | Meyer ................ A61G 7/05715 5/690 |
| 8,714,071 B2 | 5/2014 | Foley et al. |
| 8,904,584 B2 | 12/2014 | Sugano et al. |
| 8,915,339 B2 | 12/2014 | Kanous et al. |
| 8,990,987 B2 | 3/2015 | Wyman et al. |
| 2007/0277320 A1 | 12/2007 | Massmann |
| 2014/0137333 A1 | 5/2014 | DeFranks |
| 2014/0154477 A1 | 6/2014 | Chu et al. |
| 2014/0210250 A1 | 7/2014 | DiFelice |
| 2014/0304900 A1 | 10/2014 | Sugano et al. |
| 2015/0033577 A1 | 2/2015 | Dahl et al. |
| 2015/0052683 A1 | 2/2015 | Sugano et al. |
| 2015/0072103 A1 | 3/2015 | Tresso et al. |
| 2015/0075931 A1 | 3/2015 | Kanous et al. |
| 2015/0157135 A1 | 6/2015 | Wyman et al. |
| 2015/0276354 A1 | 10/2015 | Foley et al. |
| 2016/0066649 A1 | 3/2016 | Foley et al. |

OTHER PUBLICATIONS

"International Preliminary Report on Patentability Issued in PCT Application No. PCT/US2016/041796", dated Jan. 18, 2018, 7 Pages.

"Extended Search Report Issued in European Application No. 16822092.9", dated Jan. 30, 2019, 11 Pages.

* cited by examiner

PRESSURE DISTRIBUTING ALIGNED ARRAYS OF CUSHIONING VOID CELLS

CROSS REFERENCE TO RELATED APPLICATIONS

The present application claims priority to U.S. Provisional Patent Application Ser. No. 62/190,627, entitled "Pressure Distributing Aligned Arrays of Cushioning Void Cells," filed on Jul. 9, 2015, all of which is specifically incorporated by reference for all it discloses and teaches.

BACKGROUND

Cushioning systems are used in a wide variety of applications including comfort and impact protection of the human body. A cushioning system is placed adjacent a portion of the body and provides a barrier between the body and one or more objects that would otherwise impinge on the body. For example, a pocketed spring mattress contains an array of close-coupled metal springs that cushion the body from a bed frame. Similarly, chairs, gloves, knee-pads, helmets, etc. may each include a cushioning system that provides a barrier between a portion of the body and one or more objects.

A variety of structures are used for cushioning systems. For example, an array of close-coupled, closed-cell air and/or water chambers often constitutes air and water mattresses. An array of close-coupled springs often constitutes a conventional mattress. Further examples include open- or closed-cell foam and elastomeric honeycomb structures.

For cushioning systems utilizing an array of closed or open cells or springs, either the cells or springs are directly coupled together or one or more unifying layers are used to couple each of the cells or springs together at their extremities. Directly coupling the cells or springs together or indirectly coupling the extremities of the cells or springs together is effective in tying the cushioning system together.

SUMMARY

Implementations described and claimed herein include a cellular cushioning system comprising a first matrix of void cells, and a second matrix of void cells opposing the first matrix of void cells, wherein one or more peaks of each void cell in the second matrix is attached to one or more peaks of each void cell in the first matrix, and wherein the void cells of the first matrix have a higher cell resolution than the void cells of the second matrix. In another implementation, a method of manufacturing a cushioning system includes molding a first matrix of void cells, molding a second matrix of void cells, the void cells of the first matrix having a higher cell resolution than the void cells in the second matrix, and attaching peak surfaces of the void cells of the first matrix and peak surfaces of the void cells of the second matrix together. As a result, there is more even pressure distribution when a contoured object (e.g., a human body) is placed in contact with the top matrix.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. These and various other features and advantages will be apparent from a reading of the following Detailed Descriptions.

BRIEF DESCRIPTIONS OF THE DRAWINGS

DETAILED DESCRIPTIONS

Figure 1:
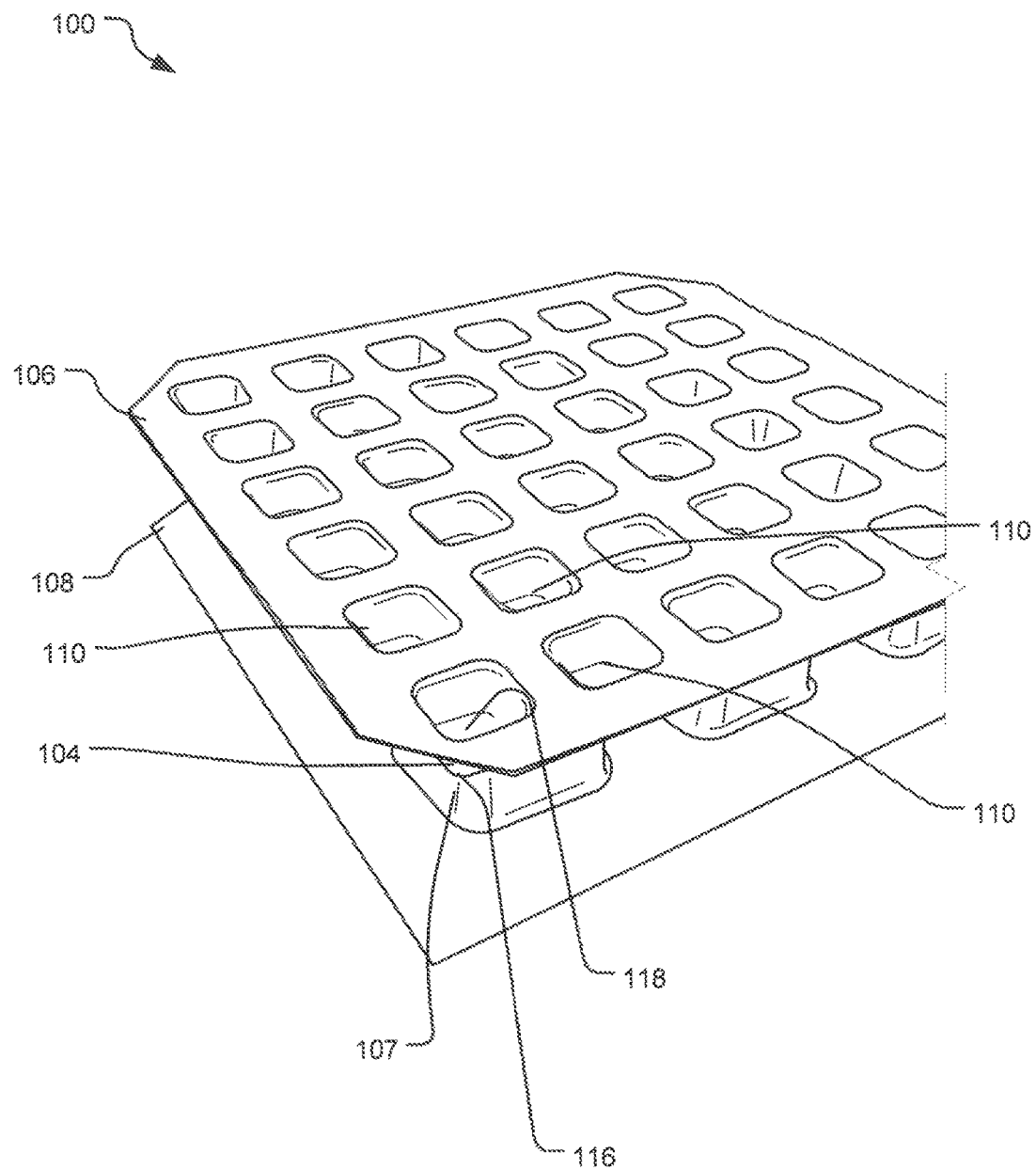
FIG. 1 illustrates a perspective top view of an example cellular cushioning system in an unloaded state.

FIG. 1 illustrates a perspective top view of an example cellular cushioning system 100 in an unloaded state. The cellular cushioning system 100 includes void cells (e.g., void cell 104 or void cell 107) arranged in two matrices. For purposes of this disclosure, the two matrices are a top matrix 106 and a bottom matrix 108. However, in another implementation, the top matrix and bottom matrix could be referred to as right side and left side matrices, first and second matrices, bottom and top matrices, etc. depending on desired terminology or configurations.

In FIG. 1, the top matrix 106 has void cells (e.g., void cell 104) that are a substantially different size and/or shape than the void cells (e.g., void cell 107) in the bottom matrix 108. In one implementation, the void cells (e.g., void cell 107) in the bottom matrix 108 are larger and deeper than the void cells (e.g., void cell 104) in the top matrix 106. In one implementation, the smaller void cells (e.g., void cell 104) are 54% smaller than the larger cells. In other implementations, the smaller void cells (e.g., void cell 104) are 5-90% smaller than the larger cells. The smaller void cells (e.g., void cell 104) in the top matrix 106 have a higher cell resolution and lower depth than the larger void cells (e.g., void cell 107) in the bottom matrix 108, yielding a softer, bottom matrix 108 and a more supportive and load-distributed, firm top matrix 106 for a user who may be sitting or walking on top of the matrices, for example.

The wall thickness of each of the void cells may vary over a height of the void cell. In each void cell, there is a peak or bottom surface, where the wall thickness may be thicker (or thinner) than the peaks or bottom surfaces of opposing void cells. The terminology for peak or bottom surface can vary depending on the implementation. In a void cell where the bottom surface is flat, the peak may be the entire bottom surface. In an implementation where the bottom of the void cell is not flat and is shaped into a "peak" near the center of the bottom surface, then the peak is the tallest feature of the bottom surface. In an implementation where the bottom surface of a void cell 107 is substantially flat, such as in FIG. 1, the wall thickness may be greater than the peak or bottom surface 116 of void cell 107, or vice versa. Varying the wall thickness of the void cells over their height can be used to yield a changing resistive force depending upon the amount of compression of the void cells (i.e., yielding a positive and/or increasing spring rate). As a result, there is even more pressure distribution across the top matrix 108 when a contoured object (e.g., a human body) is placed in contact with the top matrix 106.

The arrangement of void cells in the matrices can vary. In the implementation in FIG. 1, the center of the smaller void cells (e.g., void cell 104) in the top matrix 106 are aligned with the corners of the larger opposing void cell (e.g., void cell 107) with a 4:1 ratio of smaller void cells in the top matrix to a larger void cell in the bottom matrix. In another implementation, there may be two void cells in a top matrix opposing a void cell in a bottom matrix (e.g., a 2:1 ratio). Further, there can be other ratios of smaller void cells in the top matrix to the larger void cells in the bottom matrix. In some implementations, void cells in the bottom matrix 108 and the top matrix 106 may be offset such that they are only partially opposing or not opposing.

In implementations where the void cells are partially opposing other void cells, as opposed to directly opposing each other, there is less material in the center of each opposing void cell. Particularly in implementations where there are smaller void cells in a top matrix and larger void cells in a bottom matrix, the edges of the smaller void cells are layered on the edges of the larger void cells. These implementations provide more flexibility, improved pressure distribution, more comfort to a user, and/or more mitigating impact.

The different densities of void cells between top and bottom matrices results in each lower density matrix cell (e.g., void cell 107) being bonded to multiple higher density matrix cells (e.g., void cell 104), preventing the possibility of one void cell inverting over another void cell as the geometries are mismatched. Having layers of different void densities allows for top and bottom matrices of different heights; allowing for the top and bottom matrices to have a different relative stiffness, though the top and bottom matrices materials can be modified to avoid this, if desired.

The cellular cushioning system 100 may be manufactured using a variety of manufacturing processes (e.g., blow molding, thermoforming, extrusion, injection molding, laminating, etc.). In one implementation, the system 100 is manufactured by forming two separate matrices, a top matrix 106 and a bottom matrix 108. The two matrices are then welded, laminated, glued, or otherwise attached together at the peaks or bottom surfaces of the void cells in the top matrix 106 and the bottom matrix 108. For example, the peaks of the void cells (e.g., peak 118) of the top matrix 106 are attached to the peaks (e.g., peak 116) of the void cells of the bottom matrix 108.

Due to varying configurations with a different number of void cells in the two matrices, the attachment of the void cells to each other may occur at different points of contact on each void cell. For example, void cell 104, which is smaller than void cell 107, may attach to void cell 107 with the majority of the peak surface of the void cell 104 and void cell 110 attaching to only the peak surface corners of the void cell 107.

The void cells are hollow chambers that resist deflection due to compressive forces, similar to compression springs. However, unlike compression springs, deflection of the void cells does not yield a linear increase in resistive force. Instead, the resistive force to deflection of the void cells is relatively constant for the majority of the void cells' compression displacement. This allows the cellular cushioning system 100 to conform to a user's body with an even force on the user's body. In other implementations, each of the void cells may have a positive or negative spring rate. Further, the spring rate of each of the void cells may vary depending upon the void cell's relative position within the cellular cushioning system 100.

At least the material, wall thickness, size, and shape of each of the void cells define the resistive force each of the void cells can apply. Materials used for the void cells are generally elastically deformable under expected load conditions and will withstand numerous deformations without fracturing or suffering other breakdown impairing the function of the cellular cushioning system 100. Example materials include thermoplastic urethane, thermoplastic elastomers, styrenic co-polymers, rubber, Dow Pellethane®, Lubrizol Estane®, Dupont™ Hytrel®, ATOFINA Pebax®, and Krayton polymers. Further, the wall thickness may range from 5 mil to 80 mil. Still further, the size of each of the void cells may range from 5 mm to 70 mm sides in a cubical implementation. Further yet, the void cells may be cubical, pyramidal, hemispherical, or any other shape capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the void cells have a square or rectangular base shape, with a trapezoidal volume and a rounded top. That void cell geometry may provide a smooth compression profile of the system 100 and minimal bunching of the individual void cells. Bunching occurs particularly on corners and vertical sidewalls of the void cells where the material buckles in such a way as to create multiple folds of material that can cause pressure points and a less uniform feel to the cellular cushioning system overall. Still further, rounded tops of the void cells may enhance user comfort and the spacing of the individual void cells may create a user feel similar to convoluted foam.

In another implementation, the void cells have a round base shape, with a cylindrical-shaped volume and a rounded top. That void cell geometry may also provide a smooth compression profile of a cellular cushioning system and minimal bunching of the individual void cells. Still further, the rounded tops may enhance user comfort and the closer spacing of the individual void cells may create a more uniform feel to a user. Other void cell shapes are contemplated herein.

The material, wall thickness, cell size, and/or cell spacing of the cells within the cellular cushioning system 100 may be optimized to minimize generation of mechanical noise by compression (e.g., buckling of the side walls) of the void cells. For example, properties of the cells may be optimized to provide a smooth relationship between displacement and an applied force. Further, a light lubricating coating (e.g., talcum powder or oil) may be used on the exterior of the void cells to reduce or eliminate noise generated by void cells contacting and moving relative to one another. Reduction or elimination of mechanical noise may make use of the cellular cushioning system 100 more pleasurable to the user. Still further, geometry of the top of the void cells may be smooth to enhance user comfort.

Each void cell is surrounded by neighboring void cells within a matrix. For example, void cell 104 is surrounded by three neighboring void cells 110 within the top matrix 106. In cellular cushioning system 100, there are three neighboring void cells for each corner void cell, five neighboring void cells for each edge cell, and eight neighboring void cells for the rest of the void cells. Other implementations may have greater or fewer neighboring void cells for each void cell. Further, each void cell has one or more corresponding opposing void cell within an opposite matrix. For example, void cell 104 in the top matrix 106 is opposed by void cell 107 in the bottom matrix.

The neighboring void cells, opposing void cells, and neighbor opposing void cells are collectively referred to herein as adjacent void cells. In various implementations, one or more of the neighboring void cells, opposing void cells, and opposing neighbor void cells are not substantially compressed within an independent compression range of an individual void cell.

In one implementation, the void cells are filled with ambient air and open to the atmosphere. In another implementation, the void cells are filled with a foam or a fluid other than air. The foam or certain fluids may be used to insulate a user's body, facilitate heat transfer from the user's body to/from the cellular cushioning system 100, and/or affect the resistance to deflection of the cellular cushioning system 100. In a vacuum or near-vacuum environment (e.g., outer space), the hollow chambers may be un-filled.

Further, the void cells may have one or more apertures or holes (not shown) through which air or other fluid may pass freely when the void cells are compressed and de-compressed. By not relying on air pressure for resistance to deflection, the void cells can achieve a relatively constant resistance force to deformation. Still further, the void cells may be open to one another (i.e., fluidly connected) via passages (not shown) through the matrix. The holes and/or passages may also be used to circulate fluid for heating or cooling purposes. For example, the holes and/or passages may define a path through the cellular cushioning system 100 in which a heating or cooling fluid enters the cellular cushioning system 100, follows a path through the cellular cushioning system 100, and exits the cellular cushioning system 100. The holes and/or passages may also control the rate at which air may enter, move within, and/or exit the cellular cushioning system 100. For example, for heavy loads that are applied quickly, the holes and/or passages may restrict how fast air may exit or move within the cellular cushioning system 100, thereby providing additional cushioning to the user.

The holes may be placed on mating surfaces of opposing void cells on the cellular cushioning system 100 to facilitate cleaning. More specifically, water and/or air could be forced through the holes in the opposing void cells to flush out contaminants. In an implementation where each of the void cells is connected via passages, water and/or air could be introduced at one end of the cellular cushioning system 100 and flushed laterally through the cellular cushioning system 100 to the opposite end to flush out contaminants. Further, the cellular cushioning system 100 could be treated with an anti-microbial substance or the cellular cushioning system 100 material itself may be anti-microbial.

Figure 2:
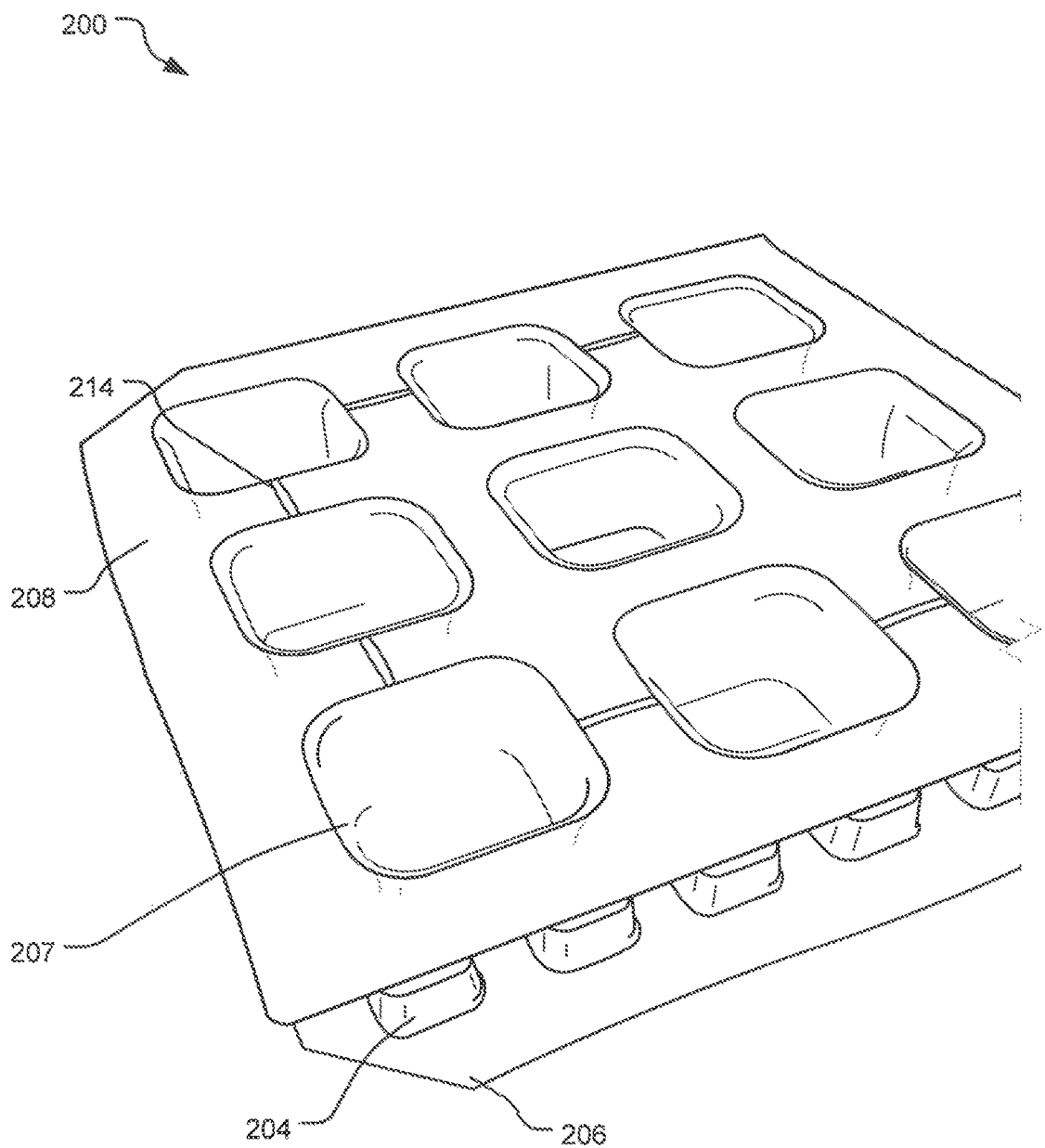
FIG. 2 illustrates a perspective bottom view of an example cellular cushioning system.

FIG. 2 illustrates a perspective bottom view of an example cellular cushioning system. The cellular cushioning system 200 includes void cells (e.g., void cell 204 or void cell 207) arranged in a top matrix 206 and a bottom matrix 208. The top matrix 206 has void cells (e.g., void cell 204) that are a substantially different size and/or shape than the void cells in the bottom matrix 208. The smaller void cells in the top matrix 206 have a higher cell resolution and lower depth than the larger void cells in the bottom matrix 208, yielding a softer bottom matrix 208 and a more supportive and load-distributed, firm top matrix 206. As a result, there is more even pressure distribution when a contoured object (e.g., a human body) is placed in contact with the top matrix 206.

The smaller void cells (e.g., void cell 204) in the top matrix 206 are aligned with the corners of the larger opposing void cell (e.g., void cell 207) in the bottom matrix 208. In this example, there is a 4:1 ratio of smaller void cells in the top matrix 206 to the larger void cells in the bottom matrix 208. In another implementation, there may four void cells in a bottom matrix 208 opposing a void cell in a top matrix 206 (e.g., a 2:1 ratio). Further, there can be other ratios of smaller void cells 204 in the top matrix 206 to the larger void cells 207 in the bottom matrix 208.

Void cells (e.g., void cell 204) which are smaller than void cell 207, attach to void cell 207 with the surfaces of their peaks to only the surface corners of the larger void cell 207. The void cells in the top matrix 206 align with the void cells in the bottom matrix 208 in a 4:1 ratio with four void cells of the top matrix 206 molded to one void cell in the bottom matrix 208. The interface where the top matrix 206 is molded to the bottom matrix 208 may be the surface of the peaks (not shown) of the void cells on the bottom matrix 208 to corners of the peaks of the void cells in the top matrix 206. The location of attachment can vary.

In FIG. 2, there are channels (e.g., channel 214) adjacent and in between the void cells (e.g., void cell 207) located on the perimeter of the cellular cushioning system 200. The channels 214 primarily function to break up the surface of the interface providing a partially independent compression of a localized region up to a point. The channels 214 can also be used to prevent the trapping of air between cells. The channels 214 may also be built in for manufacturing purposes to promote more consistent forming. The channels may be of varying sizes and in some implementations, the channels 214 can have a depth that separates the void cells and defines inverted void cells (see FIG. 6).

Figure 3:
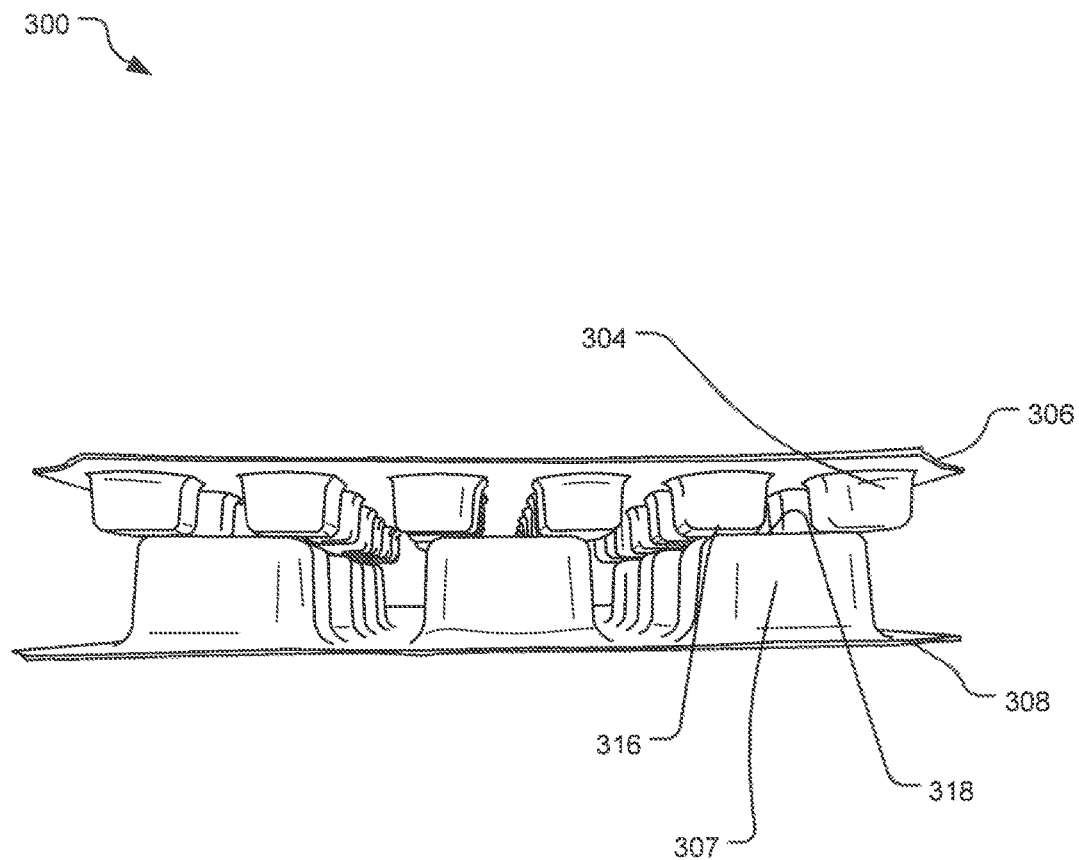
FIG. 3 illustrates an elevation view of an example cellular cushioning system.

FIG. 3 illustrates an elevation view of an example cellular cushioning system 300. The cellular cushioning system 300 includes void cells (e.g., void cell 304) arranged in a top matrix 306 and a bottom matrix 308.

The top matrix 306 has void cells (e.g., void cell 304) that are a substantially different size and/or shape than the void cells in the bottom matrix 308. Specifically, the void cells (e.g., void cell 307) in the bottom matrix 308 are larger and deeper than the void cells (e.g., void cell 304) in the top matrix 306. The smaller void cells in the top matrix 306 have a higher cell resolution and lower depth than the larger void cells in the bottom matrix 308, yielding a softer bottom matrix 308 and a more supportive top matrix 306.

The interface where the top matrix 306 is attached to the bottom matrix 308 may be the surface of the peaks (e.g., peak 318) of the void cells on the bottom matrix 308 to corners of the peaks (e.g., peak 316) of the void cells in the top matrix 306. The location of attachment can vary. The two matrices are welded, laminated, glued, or otherwise attached together at the peaks of the void cells in the top matrix 306 and the bottom matrix 308.

Figure 4:
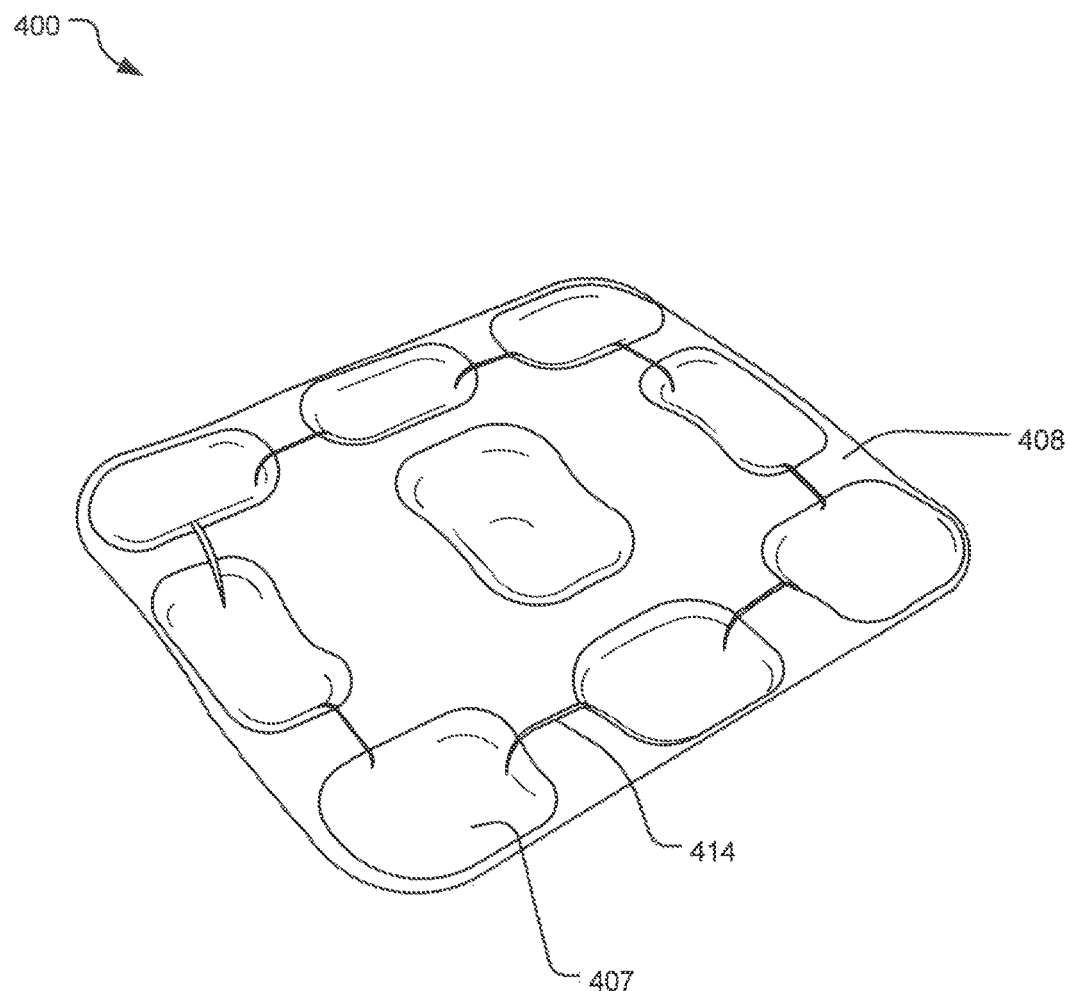
FIG. 4 illustrates a perspective bottom view of the example cellular cushioning system.

FIG. 4 illustrates a perspective bottom view of the example offset cellular cushioning system. The cellular cushioning system 400 includes void cells (e.g., void cell 407) arranged in a top matrix (not shown) and a bottom matrix 408. The top matrix has void cells that are a substantially different size and/or shape than the void cells in the bottom matrix 508. In one implementation, the void cells (e.g., void cell 407) in the bottom matrix 508 are larger and deeper than the void cells in the top matrix. The smaller void cells in the top matrix have a higher cell resolution and lower depth than the larger void cells in the bottom matrix 508, yielding a softer bottom matrix 508 and a more supportive top matrix 506.

The void cells in the bottom matrix 508 are offset from those in the top matrix such that each void cell in a matrix overlaps two or more opposing void cells. The two matrices are welded, laminated, glued, or otherwise attached together at the peaks of the void cells in the top matrix and the bottom matrix 508. For example, the peaks of the void cells in the top matrix are attached to the peaks of the void cells in the bottom matrix 508.

Figure 5:
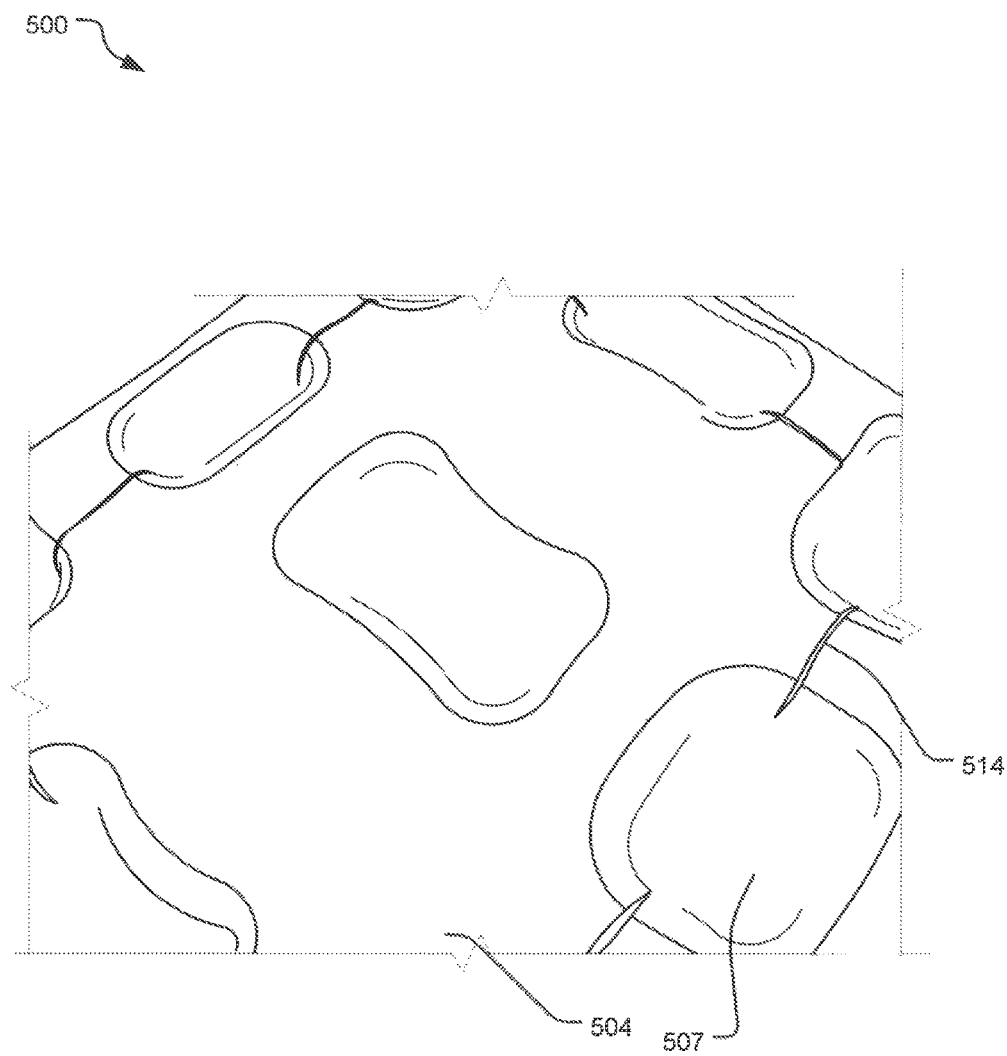
FIG. 5 illustrates an enlarged bottom view of the example cellular cushioning system of FIG. 4.

In FIG. 5, there are channels (e.g., channel 514) adjacent and in between the void cells (e.g., void cell 507) located on the perimeter of the cellular cushioning system 500. The channels 514 primarily function to break up the surface of the interface providing a partially independent compression of a localized region up to a point. The channels 514 can also be used to prevent the trapping of air between cells. The channels 514 may also be built in for manufacturing purposes to promote more consistent forming. The channels 514 may be of varying sizes and in some implementations, the channels 514 can have a depth that separates the void cells and defines inverted void cells (see FIG. 6).

FIG. 5 illustrates an enlarged bottom view of an example cellular cushioning system of FIG. 4. The cellular cushioning system 500 includes void cells (e.g., void cell 504 or void cell 407) arranged in a top matrix and a bottom matrix, which are shown but not distinguished because of their transparency over each other. The top matrix has void cells (e.g., void cell 404) that are a substantially different size and/or shape than the void cells in the bottom matrix (e.g., void cell 407).

Specifically, the void cells in the bottom matrix (e.g., void cell 407) are larger and deeper than the void cells (e.g., void cell 404) in the top matrix. The top matrix of void cells has a higher cell resolution and lower depth than the bottom matrix, yielding a softer bottom matrix and a more supportive upper matrix 406. As a result, there is more even pressure distribution across the upper matrix when a contoured object (e.g., a human body) is placed in contact with the top matrix.

The smaller void cells (e.g., void cell 404) in the top matrix are aligned with the corners of the larger opposing void cell (e.g., void cell 407). In this example, there is a ratio of smaller void cells in the top matrix to the larger void cells in the bottom matrix that vary. For example, in FIG. 4, a center void cell has a ratio of 2:1. In another implementation, there may be a 4:1 ratio or in another implementation there may be more or less than four void cells in a top matrix opposing a void cell in a bottom matrix (e.g., a 3:1 ratio). However, there can be other ratios of smaller void cells in the top matrix to the larger void cells in the bottom matrix, and there can be differing ratios of void cells within the same cellular cushioning system, (e.g., a 4:1 ratio for some opposing cells, and a 2:1 ratio for other opposing cells).

The void cell 404, which is smaller than void cell 407, attaches to void cell 407 with the surface of its peak to only the surface corners of the larger void cell 407. The void cells in the top matrix in this implementation align with the void cells in the bottom matrix in a 2:1 ratio with two void cells of the top matrix molded to one void cell in the bottom matrix. The interface where the top matrix is attached to the bottom matrix may be the surface of the peaks of the void cells on the top matrix to corners of the peaks of the void cells in the bottom matrix. The location of attachment can vary.

In FIG. 4, there are channels (e.g., channel 414) adjacent and in between the void cells (e.g., void cell 407) located on the perimeter of the cellular cushioning system 400. The channels 414 primarily function to break up the surface of the interface providing a partially independent compression of a localized region up to a point. The channels 414 can also be used to prevent the trapping of air between cells. The channels 414 may also be built in for manufacturing purposes to promote more consistent forming. The channels 414 may be of varying sizes and in some implementations, the channels 414 can have a depth that separates the void cells and defines inverted void cells (see FIG. 6).

Figure 6:
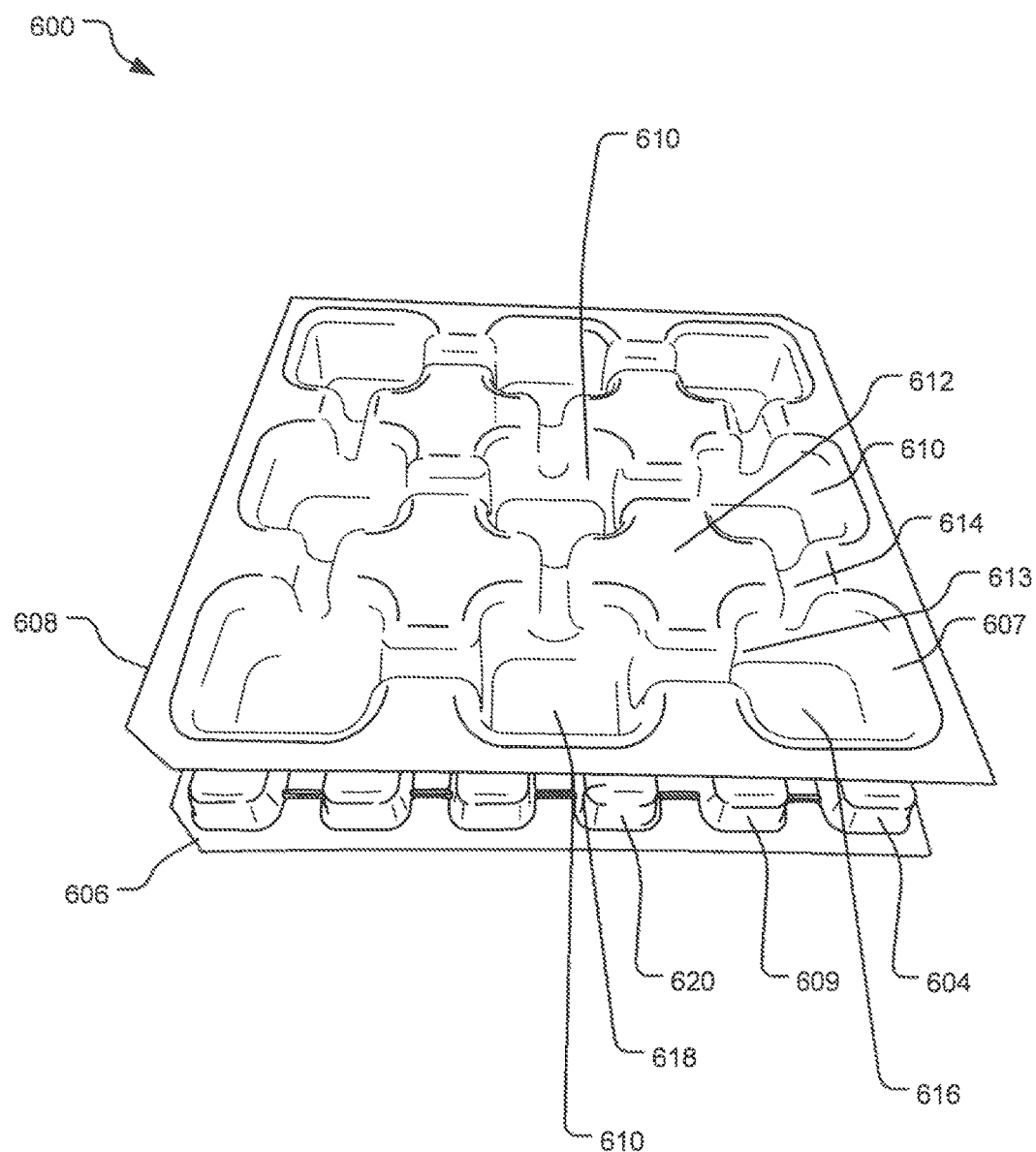
FIG. 6 illustrates a perspective bottom view of an example cellular cushioning system in an unloaded state.

FIG. 6 illustrates a perspective bottom view of an example cellular cushioning system 600 in an unloaded state. The cellular cushioning system 600 includes void cells (e.g., void cell 604 or void cell 607) arranged in two matrices. For purposes of this disclosure, the two matrices are a top matrix 606 and a bottom matrix 608. However, in another implementation, the top matrix and bottom matrix could be referred to as right side and left side matrices, first and second matrices, bottom and top matrices, etc. depending on desired terminology or configurations.

In FIG. 6, the top matrix 606 has void cells (e.g., void cell 604) that are a substantially different size and/or shape than the void cells (e.g., void cell 607) in the bottom matrix 608. In one implementation, the void cells (e.g., void cell 607) in the bottom matrix 608 are larger and deeper than the void cells (e.g., void cell 604) in the top matrix 606. The smaller void cells in the top matrix 606 have a higher cell resolution and lower depth than the larger void cells in the bottom matrix 608, yielding a softer bottom matrix 608 and a more supportive top matrix 606.

The wall thickness of each of the void cells may vary over a height of the void cell. In each void cell, there is a peak or bottom surface, where the wall thickness may be thicker (or thinner) than the peaks or bottom surfaces of opposing void cells. The terminology for peak or bottom surface can vary depending on the implementation. In a void cell where the bottom surface is flat, the peak may be the entire bottom surface. In an implementation where the bottom of the void cell is not flat and is shaped into a "peak" near the center of the bottom surface, then the peak is the tallest feature of the bottom surface. In an implementation where the bottom surface of a void cell 604 is substantially flat, such as in FIG. 1, the wall thickness may be greater than the peak or bottom surface 616 of void cell 604, or vice versa. Varying the wall thickness of the void cells over their height can be used to yield a changing resistive force depending upon the amount of compression of the void cells (i.e., yielding a positive and/or increasing spring rate). As a result, there is even more pressure distribution across the top matrix 608 when a contoured object (e.g., a human body) is placed in contact with the top matrix 606.

The arrangement of void cells in the matrices can vary. In the implementation in FIG. 6, the smaller void cells (e.g., void cells 604 and 609) in the top matrix 606 are aligned with the corners of the larger opposing void cell (e.g., void cell 607) with a 4:1 ratio of smaller void cells in the top matrix 606 to a larger void cell in the bottom matrix 608. In another implementation, there may be more or less than four void cells in a top matrix 606 opposing a void cell in a bottom matrix 608 (e.g., a 2:1 ratio). However, there can be other ratios of smaller void cells in the top matrix 606 to the larger void cells in the bottom matrix 608. In some implementations, void cells in the top matrix 606 and the bottom matrix 608 may be offset such that they are only partially opposing or not opposing (see e.g., FIG. 9).

The cellular cushioning system 600 may be manufactured using a variety of manufacturing processes (e.g., blow molding, welding, thermoforming, extrusion, injection molding, laminating, etc.). In one implementation, the system 600 is manufactured by forming two separate matrices, a top matrix 606 and a bottom matrix 608. The two matrices are then welded, laminated, glued, or otherwise attached together at the peaks or bottom surfaces of the void cells in the top matrix 606 and the bottom matrix 608. For example, the peaks of the void cells (e.g., peak 616) of the top matrix 606 are attached to the peaks (e.g., peak 618) of the void cells of the bottom matrix 608.

Due to varying configurations with a different number of void cells in the two matrices, the attachment of the void cells to each other may occur at different points of contact on each void cell. For example, void cells 604 and 609, which are smaller than void cell 607, may attach to void cell 607 with the majority of the peak surface of the void cells 604 and 609 attaching to only the peak surface corners of the void cell 607.

In some implementations, there may be channels between at least some of the void cells in a matrix. In FIG. 6, the bottom matrix 608 includes significant channels (e.g., channels 614) that separate the void cells (e.g., void cells 607 and 610) in the top matrix 606 and the bottom matrix 608. In an implementation where there are channels between all the void cells in the top matrix of a cushioning system, as shown in FIG. 6, the channels define inverted void cells (e.g., inverted void cell 612) that are evenly distributed within the bottom matrix 608. In FIG. 6, there are four inverted void cells defined by the twelve channels between nine void cells. However, the number of void cells and the number of channels can vary depending on the implementation.

The void cells are hollow chambers that resist deflection due to compressive forces, similar to compression springs. However, unlike compression springs, deflection of the void cells does not yield a linear increase in resistive force. Instead, the resistive force to deflection of the void cells is relatively constant for the majority of the void cells' compression displacement. This allows the cellular cushioning system 600 to conform to a user's body with an even force on the user's body. In other implementations, each of the void cells may have a positive or negative spring rate. Further, the spring rate of each of the void cells may vary depending upon the void cell's relative position within the cellular cushioning system 600.

At least the material, wall thickness, size, and shape of each of the void cells define the resistive force each of the void cells can apply. Materials used for the void cells are generally elastically deformable under expected load conditions and will withstand numerous deformations without fracturing or suffering other breakdown impairing the function of the cellular cushioning system 600. Example materials include thermoplastic urethane, thermoplastic elastomers, styrenic co-polymers, rubber, Dow Pellethane®, Lubrizol Estane®, Dupont™ Hytrel®, ATOFINA Pebax®, and Krayton polymers. Further, the wall thickness may range from 5 mil to 80 mil. Still further, the size of the sides of each of the void cells may range from 5 mm to 70 mm in a cubical implementation. Further yet, the void cells may be cubical, pyramidal, hemispherical, or any other shape capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the void cells have a square or rectangular base shape, with a trapezoidal volume and a rounded top. That void cell geometry may provide a smooth compression profile of the system 600 and minimal bunching of the individual void cells. Bunching occurs particularly on corners and vertical sidewalls of the void cells where the material buckles in such a way as to create multiple folds of material that can cause pressure points and a less uniform feel to the cellular cushioning system overall. Still further, rounded tops of the void cells may enhance user comfort, and the spacing of the individual void cells may create a user feel similar to convoluted foam.

In another implementation, the void cells have a round base shape, with a cylindrical-shaped volume and a rounded top. That void cell geometry may also provide a smooth compression profile of a cellular cushioning system and minimal bunching of the individual void cells. Still further, the rounded tops may enhance user comfort and the closer spacing of the individual void cells may create a more uniform feel to a user. Other void cell shapes are contemplated herein.

The material, wall thickness, cell size, and/or cell spacing of the cells within the cellular cushioning system 600 may be optimized to minimize generation of mechanical noise by compression (e.g., buckling of the side walls) of the void cells. For example, properties of the cells may be optimized to provide a smooth relationship between displacement and an applied force. Further, a light lubricating coating (e.g., talcum powder or oil) may be used on the exterior of the void cells to reduce or eliminate noise generated by void cells contacting and moving relative to one another. Reduction or elimination of mechanical noise may make use of the cellular cushioning system 600 more pleasurable to the user. Still further, geometry of the top of the void cells may be smooth to enhance user comfort.

Each void cell is surrounded by neighboring void cells within a matrix. For example, void cell 604 is surrounded by three neighboring void cells 610 within the top matrix 606. In cellular cushioning system 600, there are three neighboring void cells for each corner void cell, five neighboring void cells for each edge cell, and eight neighboring void cells for the rest of the void cells. Other implementations may have greater or fewer neighboring void cells for each void cell. Further, each void cell has one or more corresponding opposing void cell within an opposite matrix. For example, void cell 604 in the top matrix 606 is opposed by void cell 607 in the bottom matrix 608. Other implementations do not include opposing void cells for some or all of the void cells.

The neighboring void cells, opposing void cells, and neighbor opposing void cells are collectively referred to herein as adjacent void cells. In various implementations, one or more of the neighboring void cells, opposing void cells, and opposing neighbor void cells are not substantially compressed within an independent compression range of an individual void cell.

In one implementation, the void cells are filled with ambient air and open to the atmosphere. In another implementation, the void cells are filled with a foam or a fluid other than air. The foam or certain fluids may be used to insulate a user's body, facilitate heat transfer from the user's body to/from the cellular cushioning system 600, and/or affect the resistance to deflection of the cellular cushioning system 600. In a vacuum or near-vacuum environment (e.g., outer space), the hollow chambers may be un-filled.

Further, the void cells may have one or more apertures or holes (not shown) through which air or other fluid may pass freely when the void cells are compressed and de-compressed. By not relying on air pressure for resistance to deflection, the void cells can achieve a relatively constant resistance force to deformation. Still further, the void cells may be open to one another (i.e., fluidly connected) via passages (not shown) through the matrix. The holes and/or passages may also be used to circulate fluid for heating or cooling purposes. For example, the holes and/or passages may define a path through the cellular cushioning system 600 in which a heating or cooling fluid enters the cellular cushioning system 600, follows a path through the cellular cushioning system 600, and exits the cellular cushioning system 600. The holes and/or passages may also control the rate at which air may enter, move within, and/or exit the cellular cushioning system 600. For example, for heavy loads that are applied quickly, the holes and/or passages may restrict how fast air may exit or move within the cellular cushioning system 600, thereby providing additional cushioning to the user.

The holes may be placed on mating surfaces of opposing void cells on the cellular cushioning system 600 to facilitate cleaning. More specifically, water and/or air could be forced through the holes in the opposing void cells to flush out contaminants. In an implementation where all of the void cells are connected via passages, water and/or air could be introduced at one end of the cellular cushioning system 600 and flushed laterally through the cellular cushioning system 600 to the opposite end to flush out contaminants. Further, the cellular cushioning system 600 could be treated with an anti-microbial substance or the cellular cushioning system 600 material itself may be anti-microbial.

Figure 7:
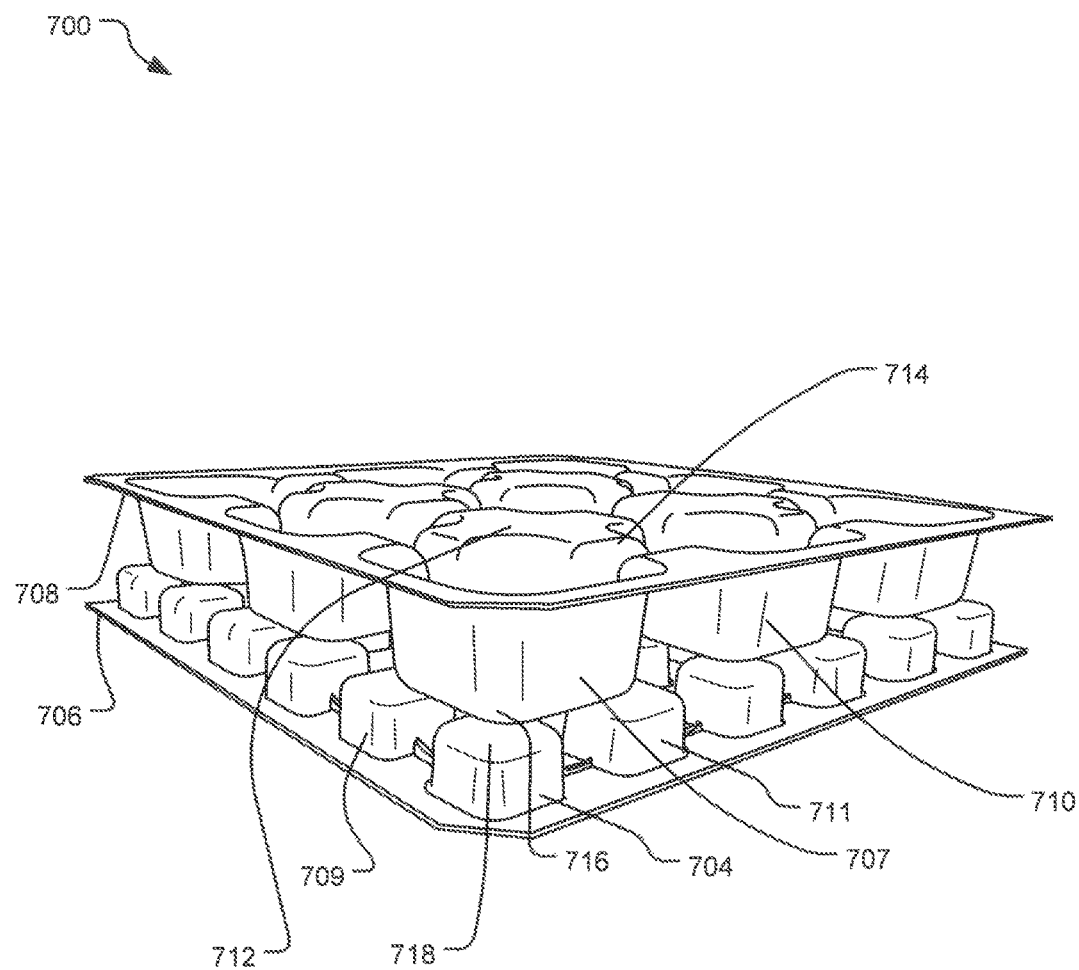
FIG. 7 illustrates a perspective side view of an example cellular cushioning system in FIG. 6.

FIG. 7 illustrates a perspective side view of an example cellular cushioning system. The cellular cushioning system 700 includes void cells (e.g., void cell 704 or void cell 707) arranged in a top matrix 706 and a bottom matrix 708. The top matrix 706 has void cells (e.g., void cell 704) that are a substantially different size and/or shape than the void cells in the bottom matrix 708. Specifically, the void cells (e.g., void cell 707) in the bottom matrix 708 are larger and deeper than the void cells (e.g., void cell 704) in the top matrix 706. The top matrix 706 of void cells has a higher cell resolution and lower depth than the bottom matrix 708, yielding a softer bottom matrix 708 and a more supportive top matrix 706. As a result, there is more even pressure distribution across the top matrix 706 when a contoured object (e.g., a human body) is placed in contact with the top matrix 706.

The smaller void cells (e.g., 704, 709, and 711) in the bottom matrix 708 are aligned with the corners of the larger opposing void cell (e.g., 707). In this example, there is a 4:1 ratio of smaller void cells in the top matrix 706 to the larger void cells in the bottom matrix 708. In another implementation, there may be more or less than four void cells in a top matrix 706 opposing a void cell in a bottom matrix 708 (e.g., a 2:1 ratio). However, there can be other ratios of smaller void cells in the top matrix 706 to the larger void cells in the bottom matrix 708.

Void cells 704 and 709, which are smaller than void cell 707, attach to void cell 707 with the surfaces of their peaks to only the surface corners of the larger void cell 707. The void cells in the top matrix 706 align with the void cells in the bottom matrix 708 in the 4:1 ratio with four void cells of the top matrix 706 molded to one void cell in the bottom matrix 708. The interface where the top matrix 706 is molded to the bottom matrix 708 may be the surface of the peaks (e.g., peak 716) of the void cells on the bottom matrix 708 to corners of the peaks (e.g., peak 718) of the void cells in the top matrix 706. The location of attachment can vary.

The bottom matrix 708 includes significant channels (e.g., channel 714) that separate the void cells (e.g., void cells 707 and 710) in the bottom matrix 708. The channels define inverted void cells (e.g., inverted void cell 712) that are evenly distributed within the bottom matrix 708. In FIG. 7, there are four inverted void cells 712 defined by the channels 714 between nine void cells. However, the number of void cells and the number of channels can vary depending on the implementation.

Figure 8:
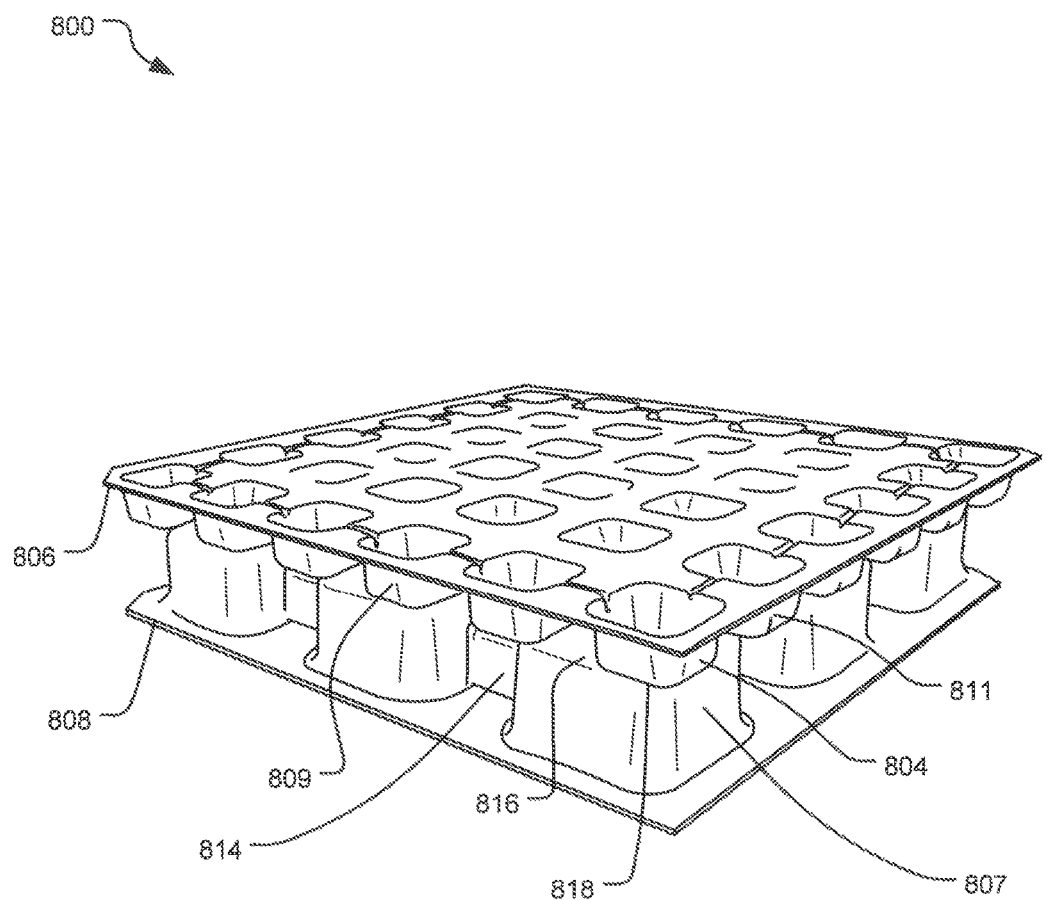
FIG. 8 illustrates a second side perspective view of an example cellular cushioning system in FIG. 6.

FIG. 8 illustrates a second side perspective view of an example cellular cushioning system. The cellular cushioning system 800 includes void cells (e.g., void cell 804 or void cell 807) arranged in a top matrix 806 and a bottom matrix 808. The top matrix 806 has void cells (e.g., void cell 804) that are a substantially different size and/or shape than the void cells in the bottom matrix 808. Specifically, the void cells (e.g., void cell 807) in the bottom matrix 808 are larger and deeper than the void cells (e.g., void cell 804) in the top matrix 806. The top matrix 806 of void cells has a higher cell resolution and lower depth than the bottom matrix 808, yielding a softer bottom matrix 808 and a more supportive top matrix 806. As a result, there is more even pressure distribution across the top matrix 806 when a contoured object (e.g., a human body) is placed in contact with the top matrix 806.

The smaller void cells (e.g., 807, 809, 811, and 818) in the bottom matrix 808 are aligned with the corners of the larger opposing void cell (e.g., void cell 804). In this example, there is a 4:1 ratio of smaller void cells in the top matrix 806 to the larger void cells in the bottom matrix 808. In another implementation, there may be more or less than four void cells in a bottom matrix opposing a void cell in a top matrix 806 (e.g., a 2:1 ratio). However, there can be other ratios of smaller void cells in the top matrix 806 to the larger void cells in the bottom matrix 808.

Void cells 807 and 809, which are smaller than void cell 804, attach to void cell 804 with the surfaces of their peaks to only the surface corners of the larger void cell 804. The void cells in the top matrix 806 align with the void cells in the bottom matrix 808 in the 4:1 ratio with four void cells of the bottom matrix 808 molded to one void cell in the top matrix 806. The interface where the top matrix 806 is attached to the bottom matrix 808 may be the surface of the peaks (e.g., peak 816) of the void cells on the bottom matrix 808 to corners of the peaks (e.g., peak 818) of the void cells in the top matrix 806. The location of attachment can vary.

The top matrix 806 includes significant channels (e.g., channels 814) that separate the void cells in the top matrix 806. The channels define inverted void cells (not shown) that are evenly distributed within the top matrix 806. In FIG. 8, there are four inverted void cells (not shown) defined by the channels 814 between nine void cells. However, the number of void cells and the number of channels can vary depending on the implementation.

Figure 9:
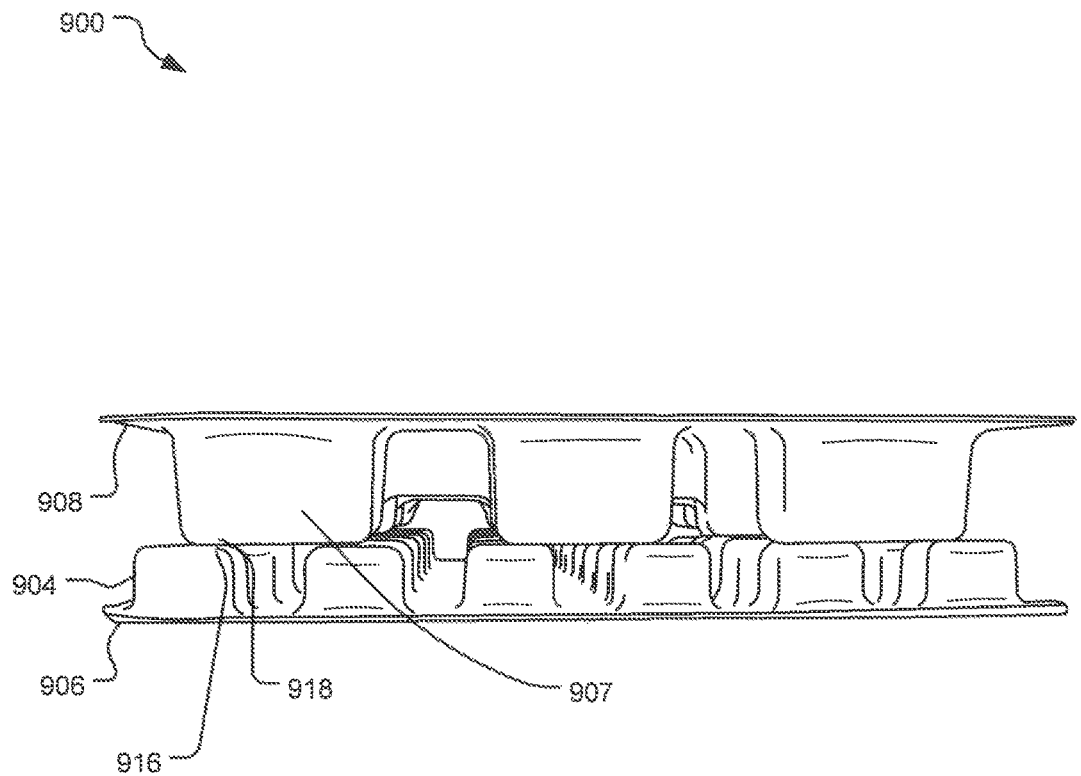
FIG. 9 illustrates an elevation view of an example cellular cushioning.

FIG. 9 illustrates an elevation view of an example cellular cushioning system 900. The cellular cushioning system 900 includes void cells (e.g., void cell 904) arranged in a top matrix 906 and a bottom matrix 908.

The top matrix 906 has void cells (e.g., void cell 904) that are a substantially different size and/or shape than the void cells (e.g., void cell 907) in the bottom matrix 908. Specifically, the void cells (e.g., void cell 907) in the bottom matrix 908 are larger and deeper than the void cells (e.g., void cell 904) in the top matrix 906. The smaller void cells in the top matrix 906 have a higher cell resolution and lower depth than the larger void cells in the bottom matrix 908, yielding a softer bottom matrix 908 and a more supportive top matrix 906.

The interface where the top matrix 906 is attached to the bottom matrix 908 may be the surface of the peaks (e.g., peak 918) of the void cells on the bottom matrix 908 to corners of the peaks (e.g., peak 916) of the void cells in the top matrix 906. The location of attachment can vary. The two matrices are welded, laminated, glued, or otherwise attached together at the peaks of the void cells in the top matrix 906 and the bottom matrix 908. For example, the peaks of the void cells (e.g., peak 916) of the top matrix 906 are attached to the peaks (e.g., peak 918) of the void cells of the bottom matrix 908.

Figure 10:
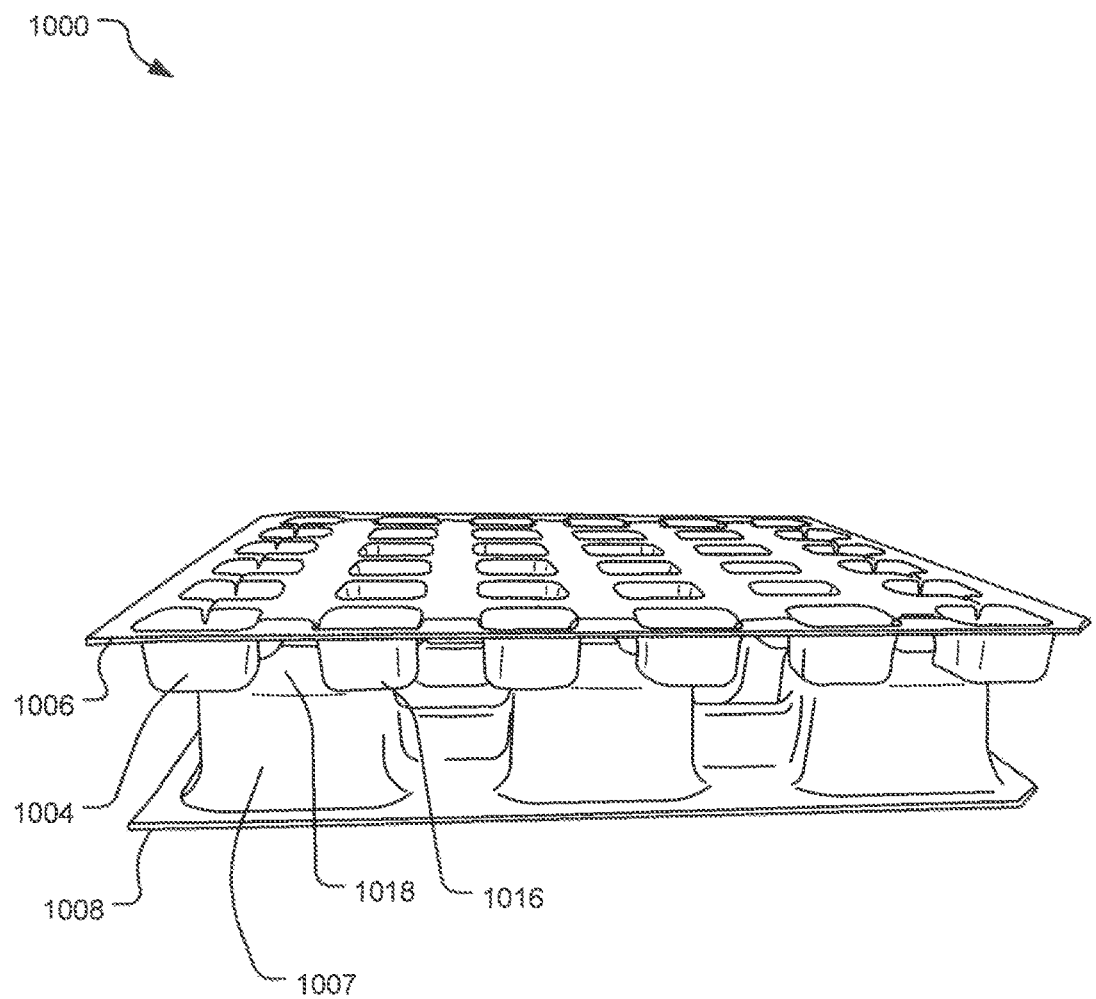
FIG. 10 illustrates a perspective view of an example cellular cushioning system.

FIG. 10 illustrates a perspective view of an example offset cellular cushioning system. The cellular cushioning system 1000 includes void cells (e.g., void cell 1004) arranged in a top matrix 1006 and a bottom matrix 1008. The top matrix 1006 has void cells (e.g., void cell 1004) that are a substantially different size and/or shape than the void cells in the bottom matrix 1008. In one implementation, the void cells (e.g., void cell 1007) in the bottom matrix 1008 are larger and deeper than the void cells (e.g., void cell 1004) in the top matrix 1006. The smaller void cells in the top matrix 1006 have a higher cell resolution and lower depth than the larger void cells in the bottom matrix 1008, yielding a softer bottom matrix 1008 and a more supportive top matrix 1006.

The void cells in the top matrix 1006 are offset from those in the bottom matrix 1008 such that each void cell in a matrix overlaps two or more opposing void cells. The two matrices are welded, laminated, glued, or otherwise attached together at the peaks of the void cells in the top matrix 1006 and the bottom matrix 1008. For example, the peaks of the void cells (e.g., peak 1016) of the top matrix 1006 are attached to the peaks (e.g., peak 1018) of the void cells of the bottom matrix 1008.

Figure 11:
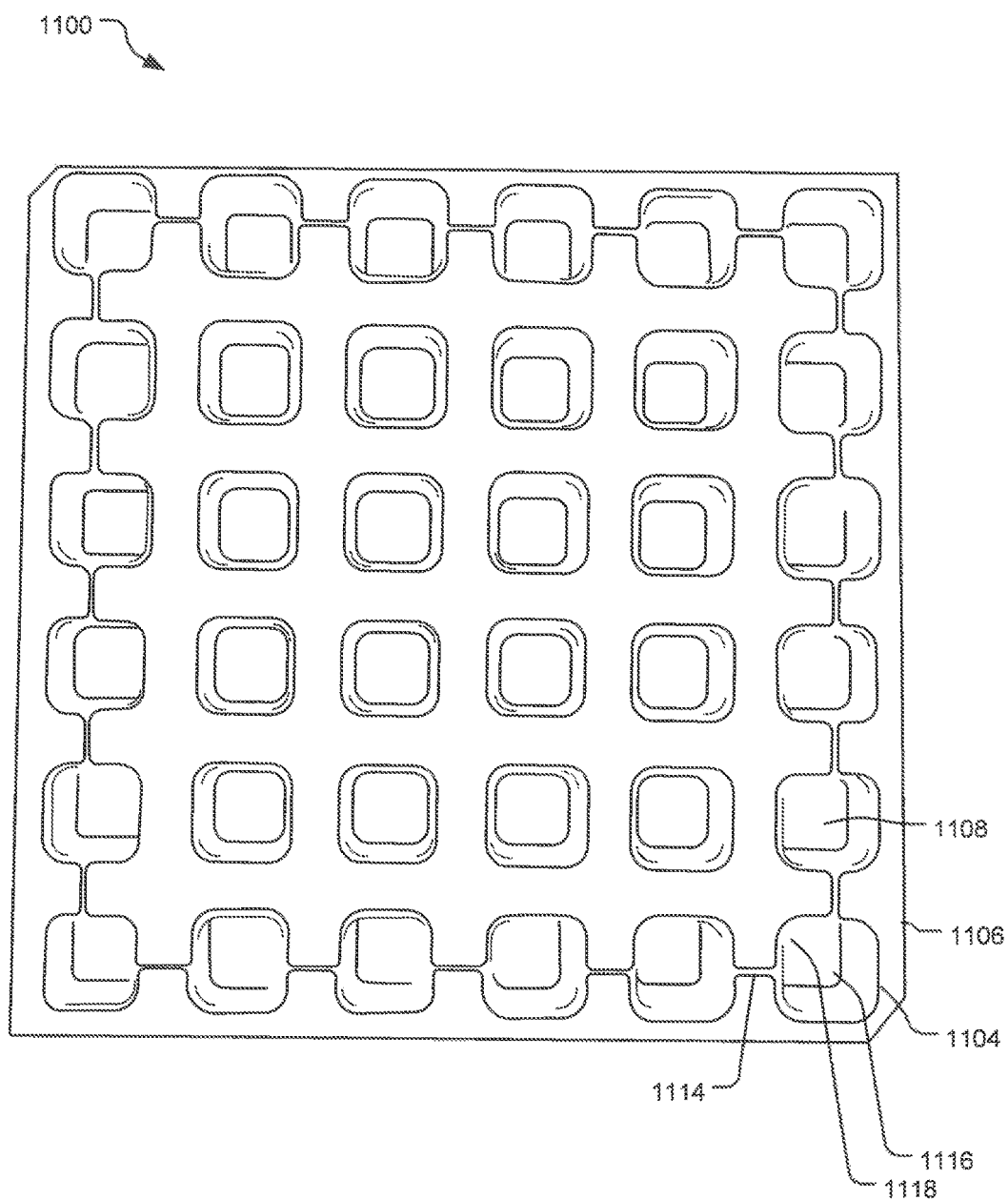
FIG. 11 illustrates a top plan view of an example cellular cushioning system in an unloaded state.

FIG. 11 illustrates a top plan view of an example cellular cushioning system 1100. The cellular cushioning system 1100 includes void cells (e.g., void cell 1104) arranged in the top matrix 1106. The two matrices are welded, laminated, glued, or otherwise attached together at the peaks of the void cells in the top matrix 1106 and the bottom matrix 1108. For example, the peaks of the void cells (e.g., peak 1116) of the top matrix 1106 are attached to the peaks (e.g., peak 1118) of the void cells of the bottom matrix 1108.

In FIG. 11, there are channels (e.g., channel 1114) adjacent and in between the void cells (e.g., void cell 1106) located on the perimeter of the cellular cushioning system 1100. The channels 1114 primarily function to break up the surface of the interface providing a partially independent compression of a localized region up to a point. The channels 1114 can also be used to prevent the trapping of air between cells. The channels 1114 may also be built in for manufacturing purposes to promote more consistent forming. The channels 1114 may be of varying sizes and in some implementations, the channels 1114 can have a depth that separates the void cells and defines inverted void cells (see FIG. 12).

Figure 12:
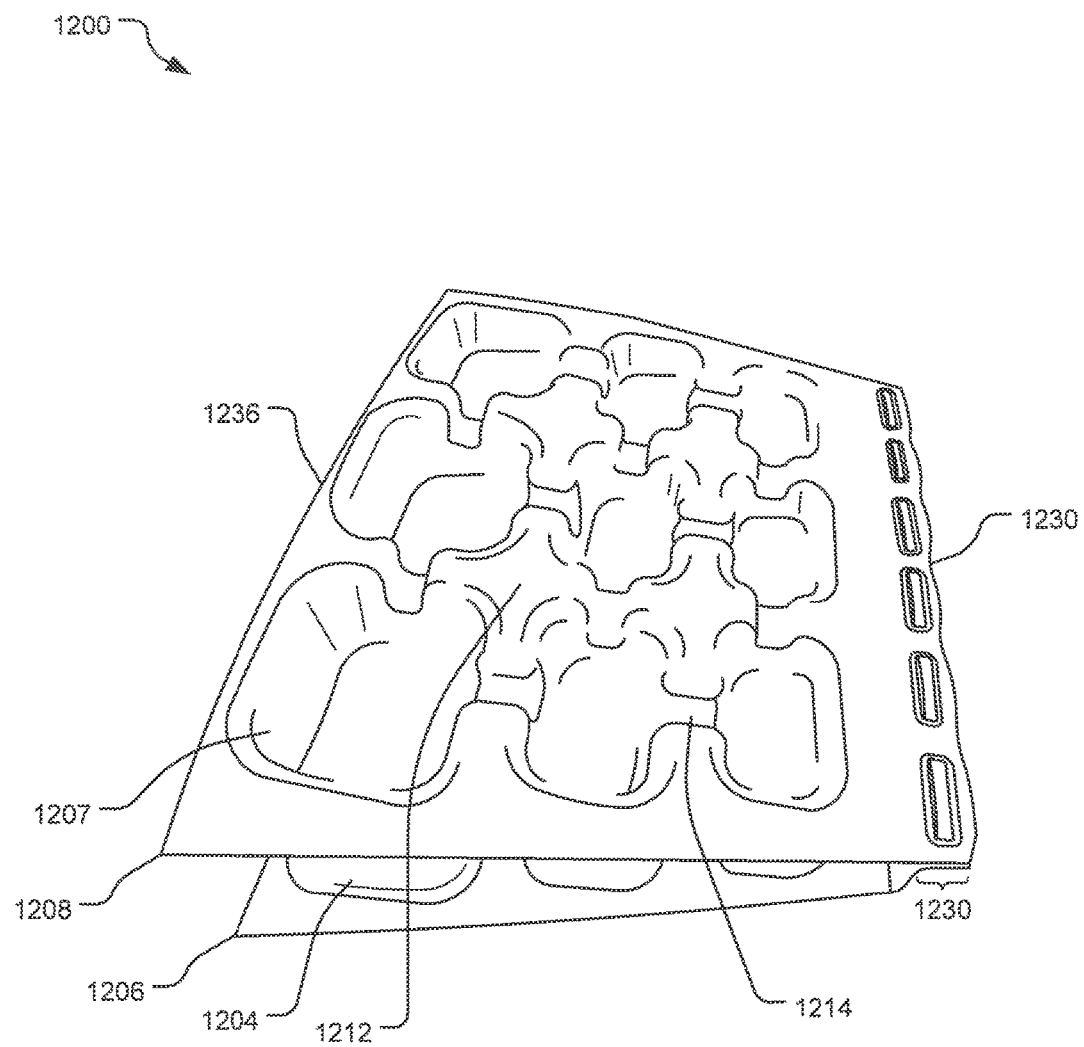
FIG. 12 illustrates a bottom perspective view of an example wedge cellular cushioning system.

FIG. 12 illustrates a perspective bottom view of an example wedge cellular cushioning system 1200 in an unloaded state. The cellular cushioning system 1200 includes void cells (e.g., void cell 1204) arranged in a top matrix 1206 and a bottom matrix 1208. The top matrix 1206 has void cells (e.g., void cell 1204) that are a substantially different size and/or shape than the void cells in the bottom matrix 1208. Specifically, the void cells (e.g., void cell 1207) in the bottom matrix 1208 are larger and deeper than the void cells (e.g., void cell 1204) in the top matrix 1206. The smaller void cells in the top matrix 1206 have a higher cell resolution and lower depth than the larger void cells in the bottom matrix 1208, yielding a softer bottom matrix 1208 and a more supportive top matrix 1206. The peak surface of the void cells of the top matrix 1206 is attached to the peak surface of the void cells of the bottom matrix 1208.

The bottom matrix 1208 includes significant channels (e.g., channel 1214) that separate the void cells in the bottom matrix 1208. The channels 1214 define inverted void cells (e.g., inverted void cell 1212) that are evenly distributed within the top matrix.

The wedge shape of the cushioning system is intended to accommodate certain sized spaces. For example, if the wedge cellular cushioning system is intended for use in a bucket seat of a vehicle, a wedge shape may be required to spatially or directionally fit the cushioning system in a predetermined sized bucket.

As shown in FIG. 12, the wedge cellular cushioning system 1200 is wedge-shaped with the end 1236 of the wedge cellular cushioning system having a greater height than the end 1230 of the wedge due to the difference in height/depth of the void cells in the wedge cellular cushioning system 1200 decreasing from one end to another end. At the end 1230, the matrices 1206 and 1208 are compressed substantially flat against each other.

Figure 13:
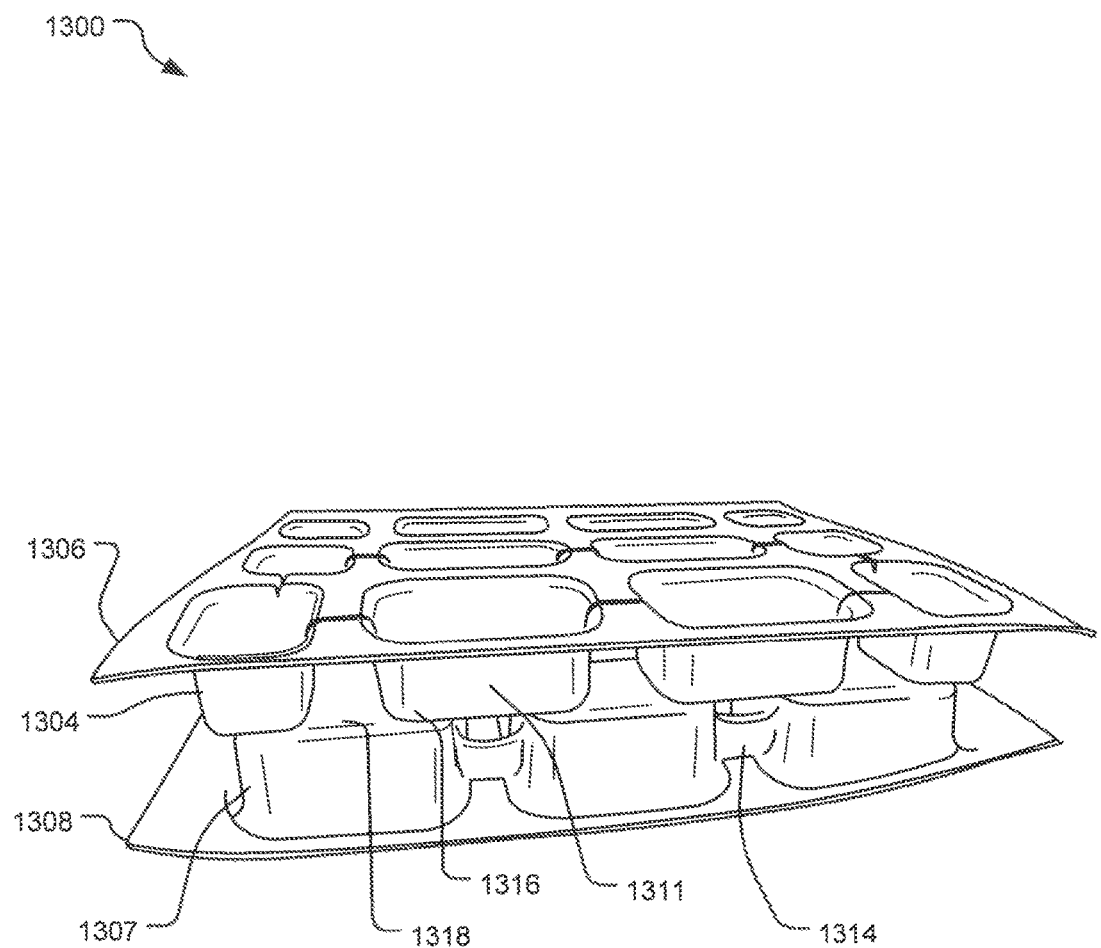
FIG. 13 illustrates a side perspective view of an example wedge cellular cushioning system.

FIG. 13 illustrates a side perspective view of an example wedge cellular cushioning system 1300. The cellular cushioning system 1300 includes void cells (e.g., void cell 1304) arranged in a top matrix 1306 and a bottom matrix 1308. The top matrix 1306 has void cells (e.g., void cell 1304) that are a substantially different size and/or shape than the void cells in the bottom matrix 1308 (e.g., void cell 1307). Specifically, the void cells (e.g., void cell 1307) in the bottom matrix 1308 are larger and deeper than the void cells (e.g., void cell 1304) in the top matrix 1306. The smaller void cells in the top matrix 1306 have a higher cell resolution and lower depth than the larger void cells in the bottom matrix 1308, yielding a softer bottom matrix 1308 and a more supportive top matrix 1306.

The two matrices are welded, laminated, glued, or otherwise attached together at the peaks of the void cells in the top matrix 1306 and the bottom matrix 1308. For example, the peaks of the void cells (e.g., peak 1316) of the top matrix 1306 are attached to the peaks (e.g., peak 1318) of the void cells of the bottom matrix 1308.

The arrangement of void cells in the matrices can vary. In the implementation in FIG. 13, the smaller void cells (e.g., void cells 1304 and 1311 shown in FIG. 13) in the top matrix 1306 are aligned by attaching to one larger opposing void cell, with a 2:1 ratio of smaller void cells in the top matrix 1306 to a larger void cell in the bottom matrix 1308. In another implementation, there may be more or less than two void cells in a top matrix 1306 opposing a void cell in a bottom matrix 1308 (e.g., a 1:1 ratio). However, there can be other ratios of smaller void cells in the top matrix 1306 to the larger void cells in the bottom matrix 1308. In some implementations, void cells in the top matrix 1306 and the bottom matrix 1308 may be offset such that they are only partially opposing or not opposing (see e.g., FIG. 14).

In FIG. 13, there are channels (e.g., channel 1314) adjacent and in between the void cells (e.g., void cell 1306) located on the perimeter of the cellular cushioning system 1300. The channels 1314 primarily function to break up the surface of the interface providing a partially independent compression of a localized region up to a point. The channels 1314 can also be used to prevent the trapping of air between cells. The channels 1314 may also be built in for manufacturing purposes to promote more consistent forming. The channels may be of varying sizes and in some implementations, the channels 1314 can have a depth that separates the void cells and defines inverted void cells (see FIG. 12).

Figure 14:
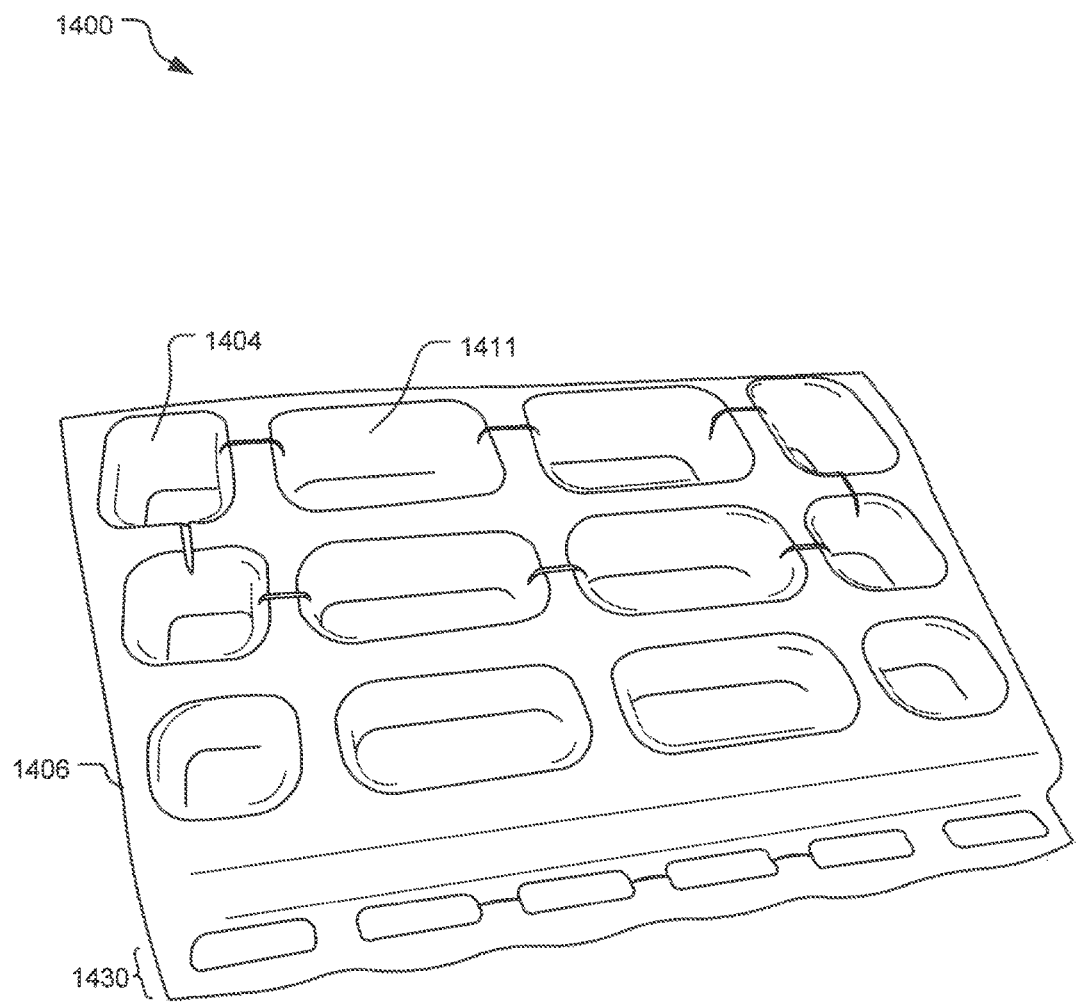
FIG. 14 illustrates a top perspective view of an example wedge cellular cushioning system.

FIG. 14 illustrates a top perspective view of an example wedge cellular cushioning system. The wedge cellular cushioning system 1400 includes void cells (e.g., void cell 1404, 1411) arranged in a top matrix 1406. The peak surfaces of the void cells in the top matrix 1406 are attached to peak surfaces of the void cells in the bottom matrix (not shown). The void cells in the top matrix 1406 have varying widths.

The wedge cellular cushioning system 1400 is wedge-shaped, where the top matrix 1406 and the bottom matrix are compressed substantially flat against each other at end 1430 of the wedge cellular cushioning system, due to the difference in height/depth of the void cells in the wedge cellular cushioning system 1400 decreasing from one end to another end.

Figure 15:
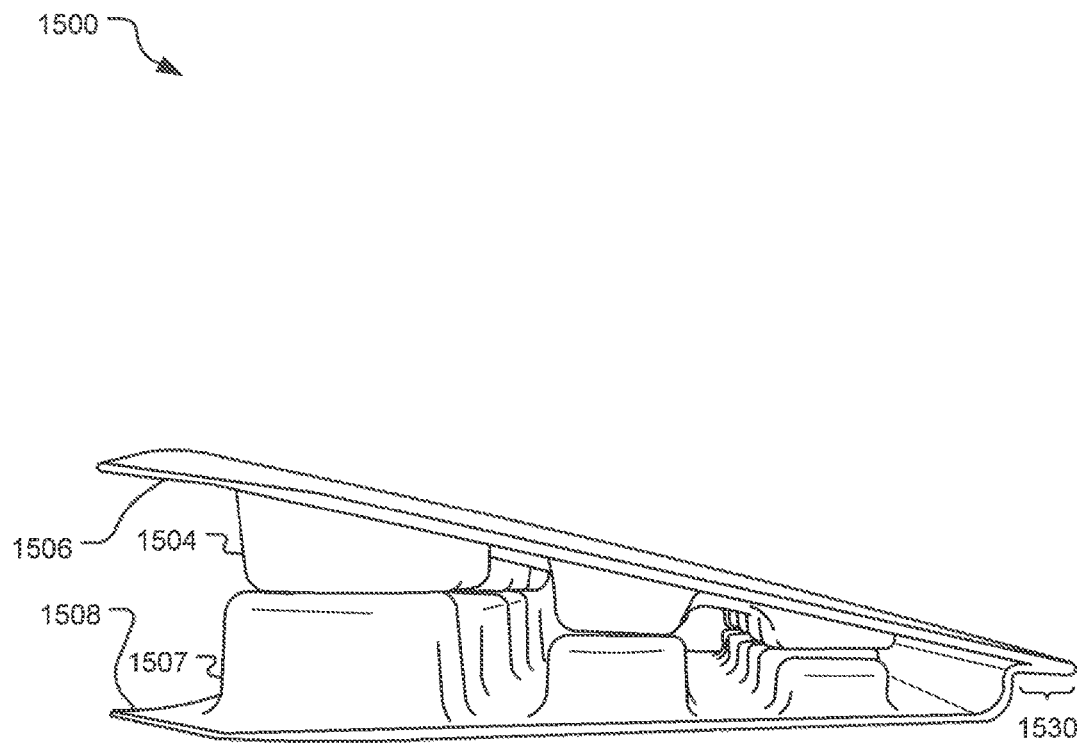
FIG. 15 illustrates an elevation view of an example wedge cellular cushioning system.

FIG. 15 illustrates an elevation view of the example wedge cellular cushioning system. The cellular cushioning system 1500 includes void cells arranged in a top matrix 1506 and a bottom matrix 1508. The top matrix 1506 has void cells (e.g., void cell 1504) that are a substantially different size and/or shape than the void cells in the bottom matrix 1508. Specifically, the void cells (e.g., void cell 1507) in the bottom matrix 1508 are larger and deeper than the void cells (e.g., void cell 1504) in the top matrix 1506. The smaller void cells in the top matrix 1506 have a higher cell resolution and lower depth than the larger void cells in the bottom matrix 1508, yielding a softer bottom matrix 1508 and a more supportive top matrix 1506.

The peak surfaces of the void cells in the top matrix 1506 are attached to the peak surfaces of the void cells of the bottom matrix 1508. The wedge cellular cushioning system 1500 is wedge-shaped, where the matrices 1506 and 1508 are compressed substantially flat against each other at end 1530 of the wedge cellular cushioning system 1500, due to the difference in height/depth of the void cells in the wedge cellular cushioning system 1500 decreasing from one end to another end.

Figure 16:
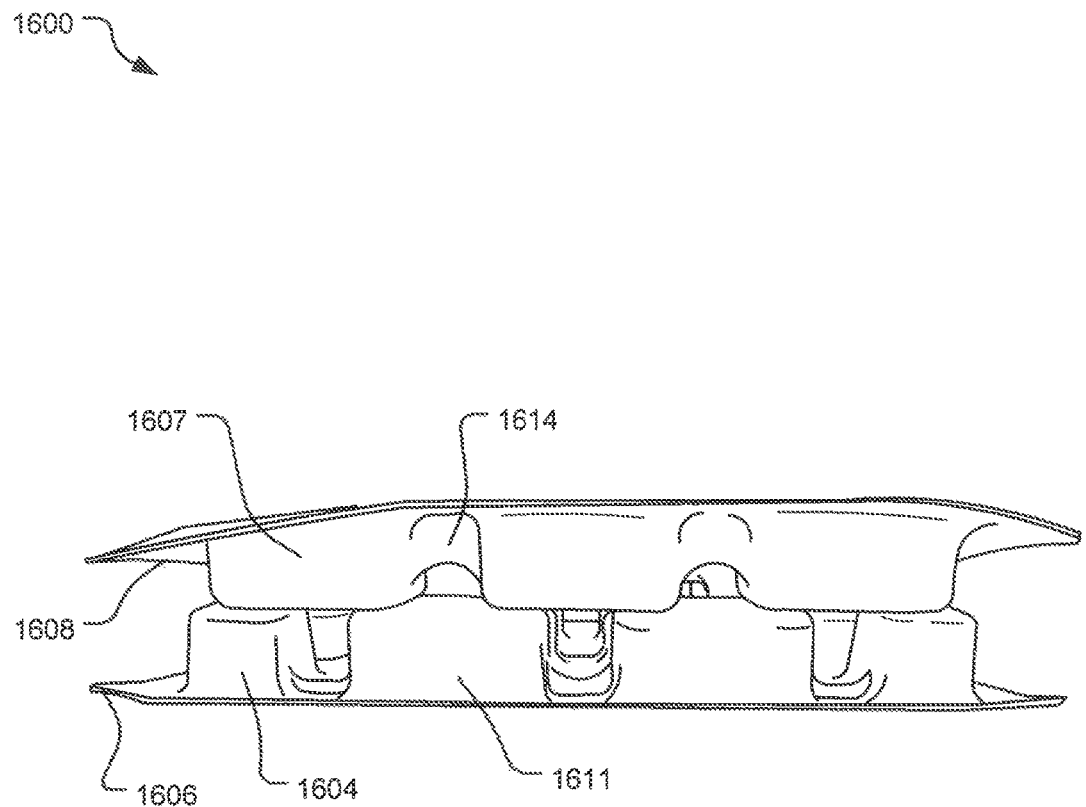
FIG. 16 illustrates a second elevation view of an example wedge cellular cushioning system.

FIG. 16 illustrates a second elevation view of the example wedge cellular cushioning system. The wedge cellular cushioning system 1600 includes void cells (e.g., void cell 1604) arranged in a top matrix 1606 and a bottom matrix 1608. The top matrix 1606 has void cells (e.g., void cell 1604) that are a substantially different size and/or shape than the void cells in the bottom matrix 1608. Specifically, the void cells (e.g., void cell 1607) in the bottom matrix 1608 are larger and deeper than the void cells (e.g., void cell 1604) in the top matrix 1606. The smaller void cells in the top matrix 1606 have a higher cell resolution and lower depth than the larger void cells in the bottom matrix 1608, yielding a softer bottom matrix 1608 and a more supportive top matrix 1606.

The top matrix includes significant channels (e.g., channel 1614) that separate the void cells in the bottom matrix 1608. The channels define inverted void cells that are evenly distributed within the bottom matrix 1608.

The peak surfaces of the void cells of the top matrix 1606 are attached to the peak surfaces of the void cells of the bottom matrix 1608. The smaller void cells (e.g., void cells 1604 and 1611) in the top matrix 1606 are aligned with the corners of the larger opposing void cells (e.g., void cells 1607) of the bottom matrix 1608.

Figure 17:
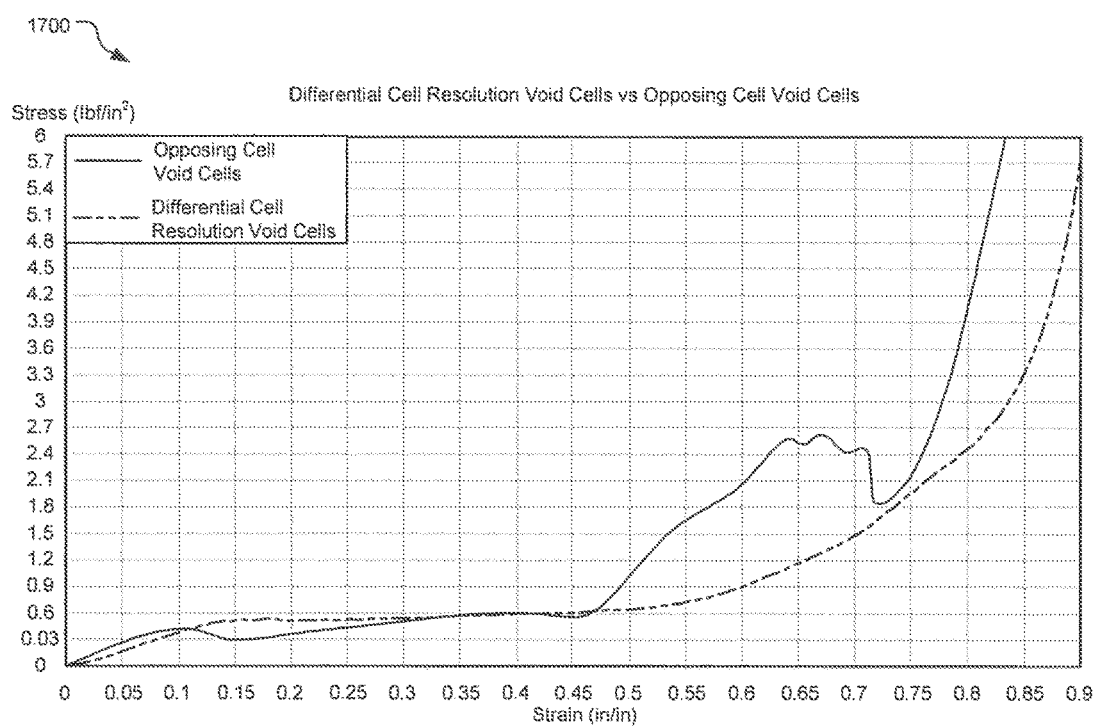
FIG. 17 is a graph of example stress/strain curves of two cushioning systems.

FIG. 17 is a graph 1700 illustrating a comparison of the stress/strain curves for an example twin square cushioning system (depicted as opposing cell void cells in a solid line) and the disclosed cushioning system of different density void cell squares (4:1) (depicted as differential cell resolution void cells in a dotted line) of the same material. The graph shows the stress curves as a measurement of stress (lbf/in$^2$) vs. strain (in/in).

The stress/strain curves can change by modifying any number of variables. The graph shows the 4:1 twin square cushioning system has a smoother stress curve without discrete compression events (i.e., the sudden increase in spring rate of the twin square seen around 0.45 strain) or sudden buckling (and negative spring rate) as compared to the twin square cushioning system.

Measurements of the different densities of the void cells and relation to pressure distribution are shown in the difference in the perimeters of the void cells. The perimeter, or sidewall, of each void cell supports the load. Therefore, the greater the total perimeter length of void cells over a given area, the greater pressure distribution over that given area will be. There is no absolute ratio, as the geometries are adjustable, but the comparison between the twin square cushioning system example and the 4:1 cushioning system shows the higher density layer of the 4:1 squares has approximately 40% more perimeter length of void cells over a given area.

Figure 18:
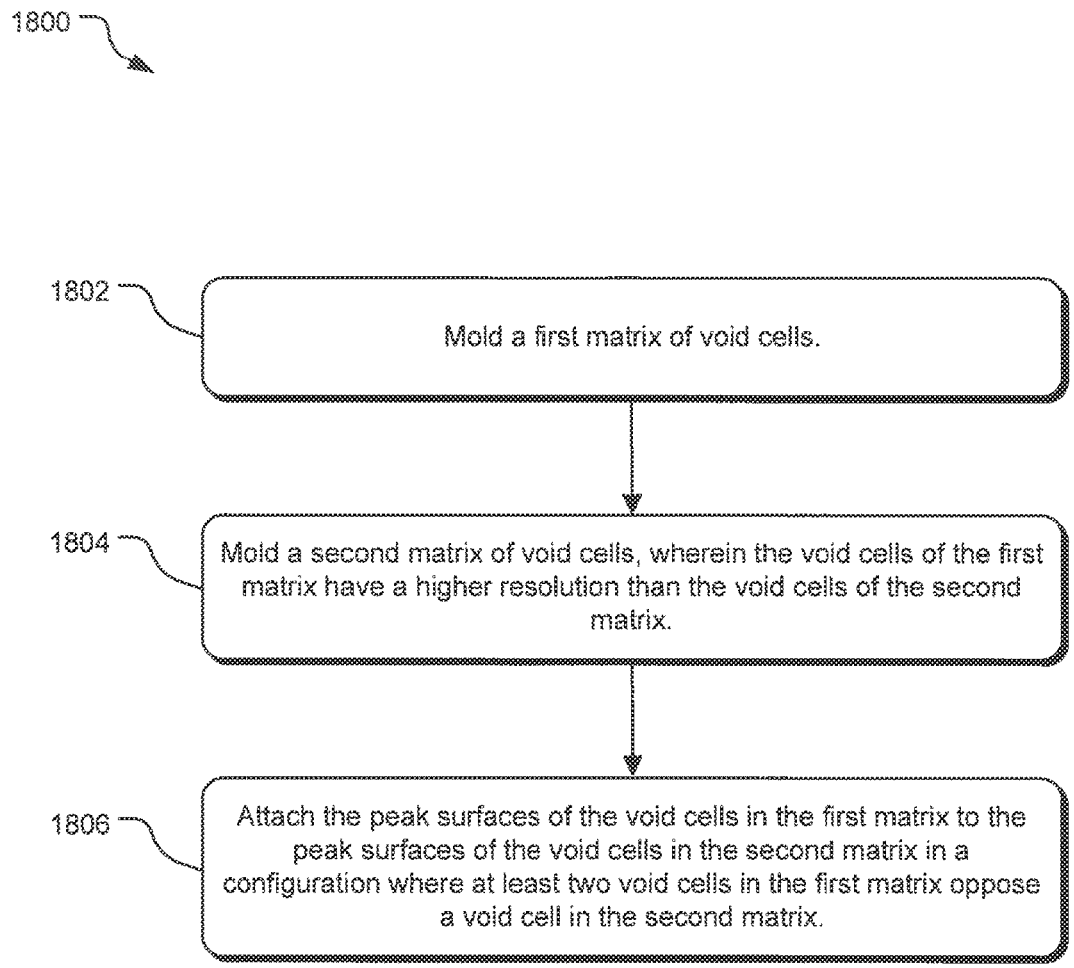
FIG. 18 is a flowchart of example operations for manufacturing an example cushioning system.

FIG. 18 illustrates example operations 1800 for manufacturing and using a cellular cushioning system. The cellular cushioning system may be molded, or in other implementations manufactured using a variety of manufacturing processes (e.g., blow molding, thermoforming, extrusion, injection molding, laminating, etc.).

A first molding operation 1802 molds a top matrix of void cells. A second molding operation 1804 molds a bottom matrix of void cells. The top matrix has void cells that are a substantially different size and/or shape than the void cells in the bottom matrix (discussed in further detail in operation 1804). In one implementation, the void cells in the bottom matrix are larger and deeper than the void cells in the top matrix. The smaller void cells in the top matrix have a higher cell resolution and lower depth than the larger void cells in the bottom matrix, yielding a softer bottom matrix and a more supportive top matrix.

The wall thickness of each of the void cells may vary over a height of the void cell. Varying the wall thickness of the void cells over their height can be used to yield a changing resistive force depending upon the amount of compression of the void cells (i.e., yielding a positive and/or increasing spring rate). As a result, there is more even pressure distribution across the top matrix when a contoured object (e.g., a human body) is placed in contact with the top matrix.

The arrangement of void cells in the matrices can vary. There may be more or less than four void cells in a top matrix opposing a void cell in a bottom matrix (e.g., a 4:1 ratio or a 2:1 ratio). There can be other ratios of smaller void cells in the top matrix to the larger void cells in the bottom matrix. In some implementations, void cells in the top matrix and the bottom matrix may be offset such that they are only partially opposing or not opposing.

The top matrix molded in operation 1802 and the bottom matrix molded in operation 1804 can include significant channels that separate the void cells in each matrix. In an implementation where there are channels between all the void cells in the matrix of a cushioning system, the channels define inverted void cells that are evenly distributed within the matrix. The number of void cells and the number of channels can vary depending on the implementation.

The void cells are hollow chambers that resist deflection due to compressive forces, similar to compression springs. However, unlike compression springs, deflection of the void cells does not yield a linear increase in resistive force. Instead, the resistive force to deflection of the void cells is relatively constant for the majority of the void cells' compression displacement. This allows the cellular cushioning system to conform to a user's body with an even force on the user's body. In other implementations, each of the void cells may have a positive or negative spring rate. Further, the spring rate of each of the void cells may vary depending upon the void cell's relative position within the cellular cushioning system.

At least the material, wall thickness, size, and shape of each of the void cells define the resistive force each of the void cells can apply. Materials used for the void cells are generally elastically deformable under expected load conditions and will withstand numerous deformations without fracturing or suffering other breakdown impairing the function of the cellular cushioning system. Example materials include thermoplastic urethane, thermoplastic elastomers, styrenic co-polymers, rubber, Dow Pellethane®, Lubrizol Estane®, Dupont™ Hytrel®, ATOFINA Pebax®, and Krayton polymers. Further, the wall thickness may range from 5 mil to 80 mil. Still further, the size of the sides of each of the void cells may range from 5 mm to 70 mm in a cubical implementation. Further yet, the void cells may be cubical, pyramidal, hemispherical, or any other shape capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the void cells have a square or rectangular base shape, with a trapezoidal volume and a rounded top. That void cell geometry may provide a smooth compression profile of the system and minimal bunching of the individual void cells. Bunching occurs particularly on corners and vertical sidewalls of the void cells where the material buckles in such a way as to create multiple folds of material that can cause pressure points and a less uniform feel to the cellular cushioning system overall. Still further, rounded tops of the void cells may enhance user comfort and the spacing of the individual void cells may create a user feel similar to convoluted foam.

In another implementation, the void cells have a round base shape, with a cylindrical-shaped volume and a rounded top. That void cell geometry may also provide a smooth compression profile of a cellular cushioning system and minimal bunching of the individual void cells. Still further, the rounded tops may enhance user comfort and the closer spacing of the individual void cells may create a more uniform feel to a user. Other void cell shapes are contemplated herein.

An attaching operation 1806 attaches the top matrix of void cells and the bottom matrix of void cells together. The two matrices can be welded, laminated, glued, or otherwise attached together at the peaks of the void cells in the top matrix and the bottom matrix.

Due to varying configurations with a different number of void cells in the two matrices, the attachment of the void cells to each other may occur at different points of contact on each void cell.

Each void cell is surrounded by neighboring void cells within a matrix. For example, each void cell is surrounded by three neighboring void cells within the top matrix. In the cellular cushioning system, there are three neighboring void cells for each corner void cell, five neighboring void cells for each edge cell, and eight neighboring void cells for the rest of the void cells. Other implementations may have greater or fewer neighboring void cells for each void cell. Further, each void cell has one or more corresponding opposing void cell within an opposite matrix. For example, each void cell in the top matrix is opposed by a void cell in the bottom matrix. Other implementations do not include opposing void cells for some or all of the void cells.

The neighboring void cells, opposing void cells, and neighbor opposing void cells are collectively referred to herein as adjacent void cells. In various implementations, one or more of the neighboring void cells, opposing void cells, and opposing neighbor void cells are not substantially compressed within an independent compression range of an individual void cell.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet other embodiments without departing from the recited claims.

What is claimed is:

1. A cellular cushioning system comprising:
   a first matrix of void cells; and
   a second matrix of void cells opposing the first matrix of void cells, wherein one or more peaks of each void cell in the second matrix is attached to one or more peaks of each void cell in the first matrix, and wherein the void cells of the first matrix have a higher cell resolution than the void cells of the second matrix.

2. The cellular cushioning system of claim 1, wherein the void cells of the first matrix have a different wall thickness than the void cells of the second matrix.

3. The cellular cushioning system of claim 1, wherein at least two void cells in the first matrix partially oppose one void cell in the second matrix.

4. The cellular cushioning system of claim 1, further comprising:
   one or more channels configured to separate the void cells in at least one of the first matrix and the second matrix.

5. The cellular cushioning system of claim 1, wherein the void cells are filled with at least one of foam and fluid.

6. The cellular cushioning system of claim 1, wherein the void cells of the first matrix and the void cells of the second matrix are molded by one of a thermoforming, extrusion, laminating, blow molding, and injection molding process.

7. The cellular cushioning system of claim 1, wherein the void cells of a top matrix and the void cells of a bottom matrix comprise of at least one of thermoplastic urethane, thermoplastic elastomers, styrenic co-polymers, and rubber.

8. The cellular cushioning system of claim 1, wherein the cellular cushioning system is wedge-shaped.

9. A cellular cushioning system comprising:
a first matrix of void cells; and
a second matrix of void cells opposing the first matrix of void cells, wherein individual void cells in the first matrix of void cells are smaller than the individual void cells in the second matrix of void cells, wherein the second matrix of void cells is attached to the first matrix of void cells, wherein the void cells of the first matrix have a higher cell resolution than the void cells of the second matrix, and wherein four void cells in the first matrix oppose one larger cell in the second matrix.

10. The cellular cushioning system of claim 9, wherein the void cells of the first matrix have a different density than the void cells of the second matrix.

11. The cellular cushioning system of claim 9, further comprising:
one or more channels configured to separate the void cells of at least one of a top matrix and a bottom matrix.

12. The cellular cushioning system of claim 9, wherein the void cells of a top matrix and the void cells of a bottom matrix are molded by one of a thermoforming, extrusion, laminating, blow molding, and injection molding process.

13. The cellular cushioning system of claim 9, wherein the void cells of a top matrix and the void cells of a bottom matrix comprise of at least one of thermoplastic urethane, thermoplastic elastomers, styrenic co-polymers, and rubber.

14. A method of manufacturing a cellular cushioning system comprising:
molding a first matrix of void cells;
molding a second matrix of void cells, the void cells of the first matrix having a higher cell resolution than the void cells of the second matrix; and
attaching peak surfaces of the void cells of the first matrix and peak surfaces of the void cells of the second matrix together.

15. The method of claim 14, further comprising:
molding a first matrix of void cells having a lower depth than the void cells of the second matrix.

16. The method of claim 14, wherein attaching the peak surfaces of the void cells of the first matrix and the peak surfaces of the void cells of the second matrix together includes attaching at least two void cells of the first matrix to the peak surface of one void cell of the second matrix.

17. The method of claim 14, wherein attaching the peak surfaces of the void cells of the first matrix and the peak surfaces of the void cells of the second matrix together includes at least two void cells of the first matrix opposing one void cell of the second matrix.

18. The method of claim 14, wherein attaching the peak surfaces of the void cells of the first matrix and the peak surfaces of the void cells of the second matrix together includes at least two void cells of the first matrix partially opposing one void cell of the second matrix.

19. The method of claim 14, further comprising molding channels in at least one of the first matrix and the second matrix.

20. The method of claim 14, wherein attaching the peak surfaces of the void cells of the first matrix and the peak surfaces of the void cells of the second matrix together is in a wedge-shaped configuration.

* * * * *